(12) United States Patent
Maupin et al.

(10) Patent No.: US 8,776,674 B2
(45) Date of Patent: *Jul. 15, 2014

(54) ROTARY SCREW BLANCHER

(75) Inventors: Daniel D. Maupin, Corvallis, OR (US); David R. Zittel, Columbus, WI (US)

(73) Assignee: Lyco Manufacturing, Inc., Columbus, WI (US)

( * ) Notice: Subject to any disclaimer, the term of this patent is extended or adjusted under 35 U.S.C. 154(b) by 308 days.

This patent is subject to a terminal disclaimer.

(21) Appl. No.: 13/326,453

(22) Filed: Dec. 15, 2011

(65) Prior Publication Data

US 2012/0085246 A1    Apr. 12, 2012

Related U.S. Application Data

(63) Continuation of application No. 12/608,486, filed on Oct. 29, 2009, now Pat. No. 8,087,348, which is a continuation-in-part of application No. 11/216,478, filed on Aug. 31, 2005, now Pat. No. 7,735,415.

(51) Int. Cl.
    *A47J 37/12* (2006.01)
(52) U.S. Cl.
    USPC .............................. 99/348; 99/404; 99/443 C
(58) Field of Classification Search
    USPC ............ 99/348, 404, 405, 406, 443 C, 443 R; 366/318, 324, 144, 90, 79
    See application file for complete search history.

(56) References Cited

U.S. PATENT DOCUMENTS

| | | | |
|---|---|---|---|
| 2,299,080 A | 10/1942 | DeBack | |
| 2,314,871 A | 3/1943 | DeBack | |
| 4,181,072 A | 1/1980 | Hirahara | |
| 4,291,619 A | 9/1981 | Hunt et al. | |
| 4,688,476 A | 8/1987 | Zittel | |
| 4,942,810 A | 7/1990 | Zittel et al. | |
| 5,133,249 A | 7/1992 | Zittel | |
| 5,146,841 A | 9/1992 | Zittel | |
| 5,327,817 A | 7/1994 | Zittel | |
| 5,329,842 A | 7/1994 | Zittel | |
| 5,341,729 A | 8/1994 | Zittel | |
| 5,427,015 A | 6/1995 | Zittel | |
| 5,429,041 A | 7/1995 | Zittel | |
| 5,592,869 A | 1/1997 | Zittel | |
| 5,632,195 A | 5/1997 | Zittel | |
| 5,669,288 A | 9/1997 | Zittel et al. | |
| 5,752,431 A | 5/1998 | Zittel | |

(Continued)

OTHER PUBLICATIONS

05258075, EP, Search Report, Lyco Manufacturing, Inc.

(Continued)

*Primary Examiner* — Reginald L Alexander
(74) *Attorney, Agent, or Firm* — George R. Corrigan

(57) ABSTRACT

A food processing apparatus includes a pressure vessel defining a compartment having an inlet end for receiving food product and an outlet end for discharging food product, an open-top screen mounted within the compartment and movable relative to the compartment between a first position, for food processing, and a second position, to facilitate cleaning, a rotatable auger mounted such that at least a portion of the auger is within the screen, the auger being operable to advance food product within the compartment from the inlet end of the pressure vessel toward the outlet end, and a transfer mechanism including a conduit in communication with the compartment, a fluid discharge positioned substantially within the conduit, and a pressurized fluid source in communication with the fluid discharge and operable to propel a fluid through the fluid discharge to move food product through the conduit.

18 Claims, 19 Drawing Sheets

(56) References Cited

U.S. PATENT DOCUMENTS

| | | | |
|---|---|---|---|
| 5,802,961 | A | 9/1998 | Hay et al. |
| 5,941,165 | A | 8/1999 | Butte |
| 5,972,413 | A | 10/1999 | Whitney et al. |
| 6,095,035 | A | 8/2000 | Zittel et al. |
| 6,105,485 | A | 8/2000 | Zittel |
| 6,187,360 | B1 | 2/2001 | Zittel |
| 6,205,913 | B1 | 3/2001 | Zittel et al. |
| 6,214,400 | B1 | 4/2001 | Zittel et al. |
| 6,234,066 | B1 | 5/2001 | Zittel et al. |
| 6,263,785 | B1 | 7/2001 | Zittel |
| 6,817,284 | B2 | 11/2004 | Zittel |
| 7,500,426 | B2 | 3/2009 | Zittel et al. |
| 8,087,348 | B2 | 1/2012 | Maupin et al. |
| 2006/0283333 | A1 | 12/2006 | Zittel et al. |
| 2007/0044666 | A1 | 3/2007 | Zittel et al. |
| 2010/0014925 | A1 | 1/2010 | Stousland et al. |
| 2010/0015311 | A1 | 1/2010 | Stousland et al. |

OTHER PUBLICATIONS 0523925.5-2313, EP, Search Report.

Idaho Steel, Product Detail—Blancher or Preheater, available online at: <http://www.idahosteel.com/Blancher.htm>, at least as early as Aug. 2008.

G. J. Oleny, Inc., Destoning Washer with E-Z Clean Stone Crib for Peas and Lima Beans, Brochure, Bulletin 96SB29, available at least as early as Aug. 2008.

Venturi Jet Pumps Ltd., Hooper Eductors, Hooper Eductors for pumping and conveying granular solids and powders, available online at: <http://www.venturipumps.com/hoppereductor.htm>, available at least as early as Aug. 2008.

Stratton, Harry, "Liquid Jet Eductors—The "Pumps" with No Moving Parts", Plant Engineering, Apr. 29, 1976.

Schutte & Koerting, Solids Handling Eductors Eductors Using Liquid in Handling Dry Solids, available online at: <http://www.s-k.com/pages/pro.sub.--02.sub.--02.html>, available at least as early as May 2009.

Northeast Controls Inc., Intermittent Operation Arrangement, available online at: <http://www.nciweb.net/newpage61.htm>, available at least as early as May 2009.

Schutte & Koerting, Eductors & Syphons—Annular Multi-Nozzle Eductor, available online at: <http://www.s-k.com/pages/pro.sub.--01.sub.--07.html>, available at least as early as May 2009.

Derbyshire Machine & Tool Co., Peri-Jets & Eductors, available online at: <http://www.derbyshiremachine.com/perijet.html>, available at least as early as Jun. 2008.

Exair, How the Exair Line Vac Works, Air Operated Conveyors, available online at: <http://www.exair.com/en-US/Primary%20Navigation/Products/Air%20Operated%20Conveyors/Pages/How%20Line%20Va%20Works.aspx>, available at least as early as May 2009.

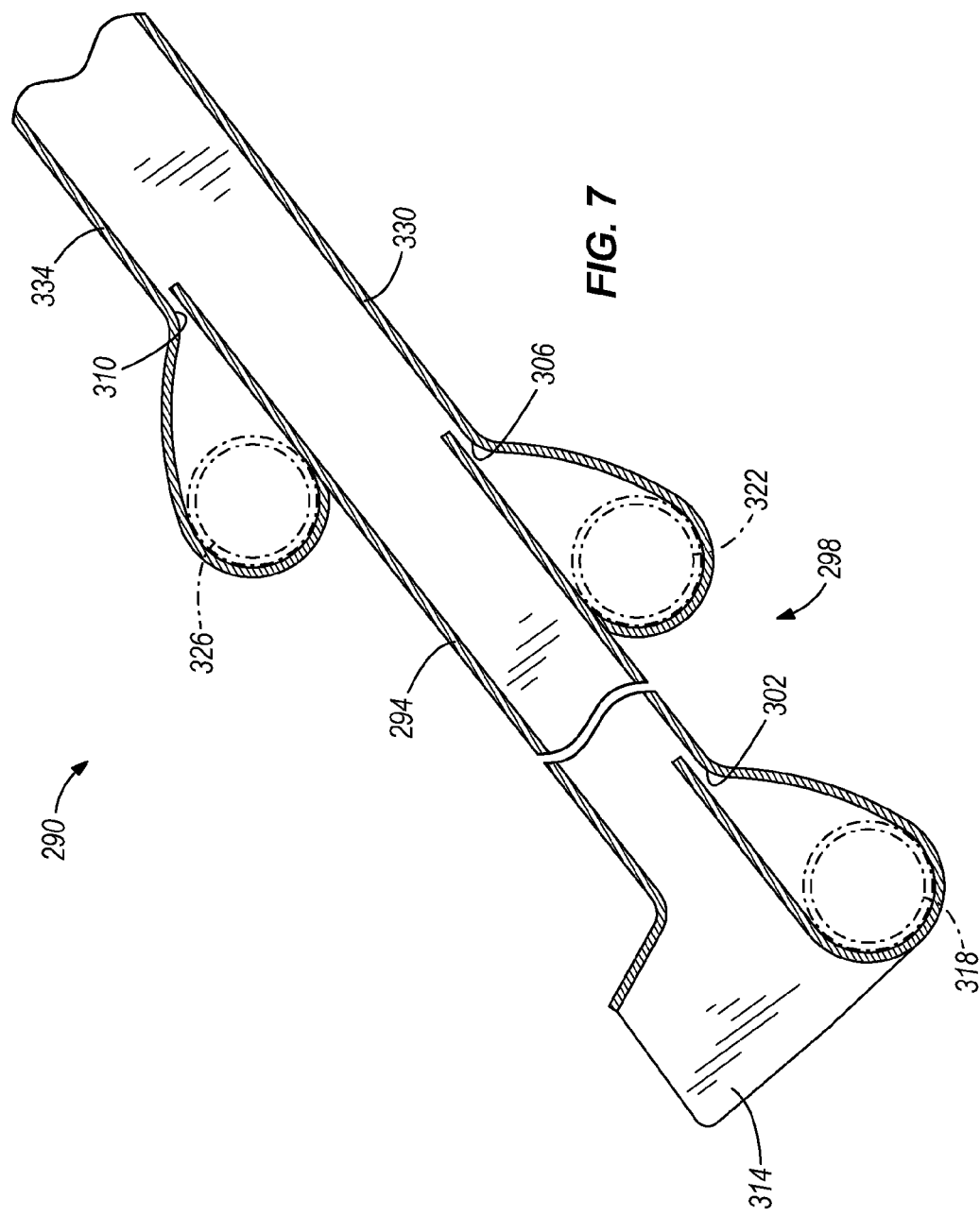

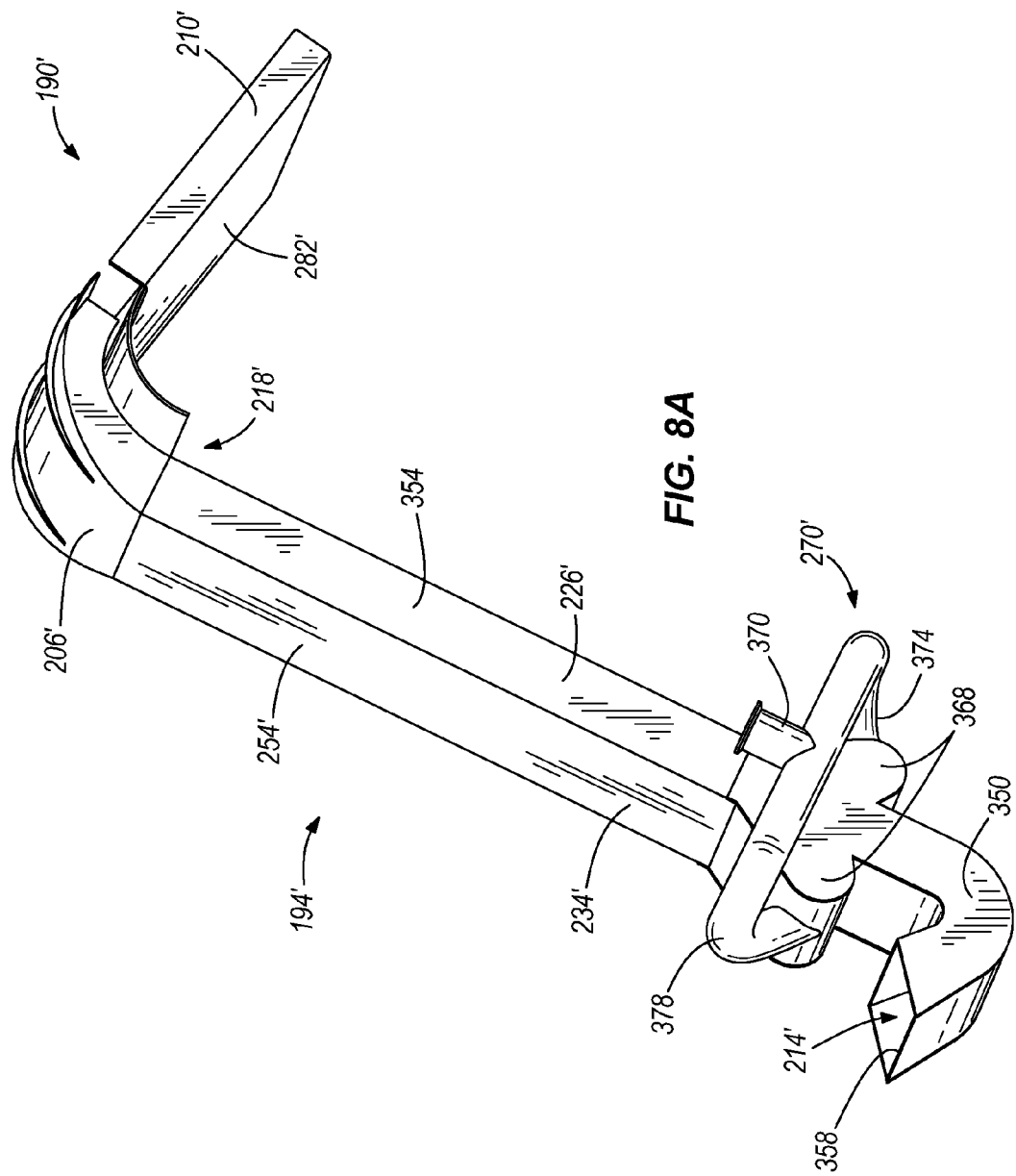

US 8,776,674 B2

ROTARY SCREW BLANCHER

RELATED APPLICATION

The present application is a continuation-in-part of and claims priority to co-pending U.S. patent application Ser. No. 11/216,478, filed Aug. 31, 2005, the entire contents of which are hereby incorporated by reference.

FIELD OF THE INVENTION

The present invention relates to blanchers and, more particularly, to rotary screw blanchers.

SUMMARY

In one embodiment and in some constructions, a food processing apparatus may generally include a pressure vessel defining a compartment having an inlet end for receiving food product and an outlet end for discharging food product, an open-top screen mounted within the compartment, the screen being movable relative to the compartment between a first position, for food processing, and a second position, to facilitate cleaning, and a rotatable auger mounted such that at least a portion of the auger is within the screen, the auger being operable to advance food product within the compartment from the inlet end toward the outlet end.

In another embodiment, a food processing apparatus may generally include a pressure vessel defining at least one compartment having an inlet end for receiving food product and an outlet end for discharging food product, a conveyor mechanism mounted in the compartment and operable to move food product from the inlet end and toward the outlet end, and a transfer mechanism including a conduit positioned in the pressure vessel and including a first end portion configured to be in communication with the compartment and a second end portion, a fluid discharge positioned substantially within the conduit between the first end portion and the second end portion, and a pressurized fluid source in communication with the fluid discharge, the pressurized fluid source being operable to propel a fluid through the fluid discharge to move food product from the first end portion of the conduit toward the second end portion of the conduit.

In yet another embodiment, a food processing apparatus may generally include a compartment having an inlet end for receiving food product and an outlet end for discharging food product; a conveyor mechanism mounted in the compartment and operable to move food product from the inlet end and toward the outlet end, the conveyor mechanism including an open-top screen mounted within the compartment and movable between a first position, for food processing, and a second position, to facilitate cleaning, the screen having a circumferentially-extending screen surface, the screen surface defining a screen opening proximate an outlet end of the screen, and a rotatable auger mounted such that at least a portion of the auger is within the screen, the auger being operable to advance food product within the compartment from the inlet end toward the outlet end, and a transfer mechanism including a conduit including a first end portion configured to be in communication with the compartment and a second end portion, a fluid discharge positioned substantially within the conduit between the first end portion and the second end portion, and a pressurized fluid source in communication with the fluid discharge, the pressurized fluid source operable to propel a fluid through the fluid discharge to move food product from the first end portion of the conduit toward the second end portion of the conduit. With the screen in the first position, the first end portion of the conduit is in communication with the screen opening such that the transfer mechanism is operable to move food product from the screen, through the screen opening and toward the second end portion of the conduit.

Other independent aspects of the invention will become apparent by consideration of the detailed description, claims and accompanying drawings.

BRIEF DESCRIPTION OF THE DRAWINGS

FIG. 7 is a cross-sectional view of another transfer mechanism for use with the blancher shown in FIG. 1.

FIGS. 8A-8C are perspective views of a yet another transfer mechanism for use with the blancher shown in FIG. 1.

Before any independent embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
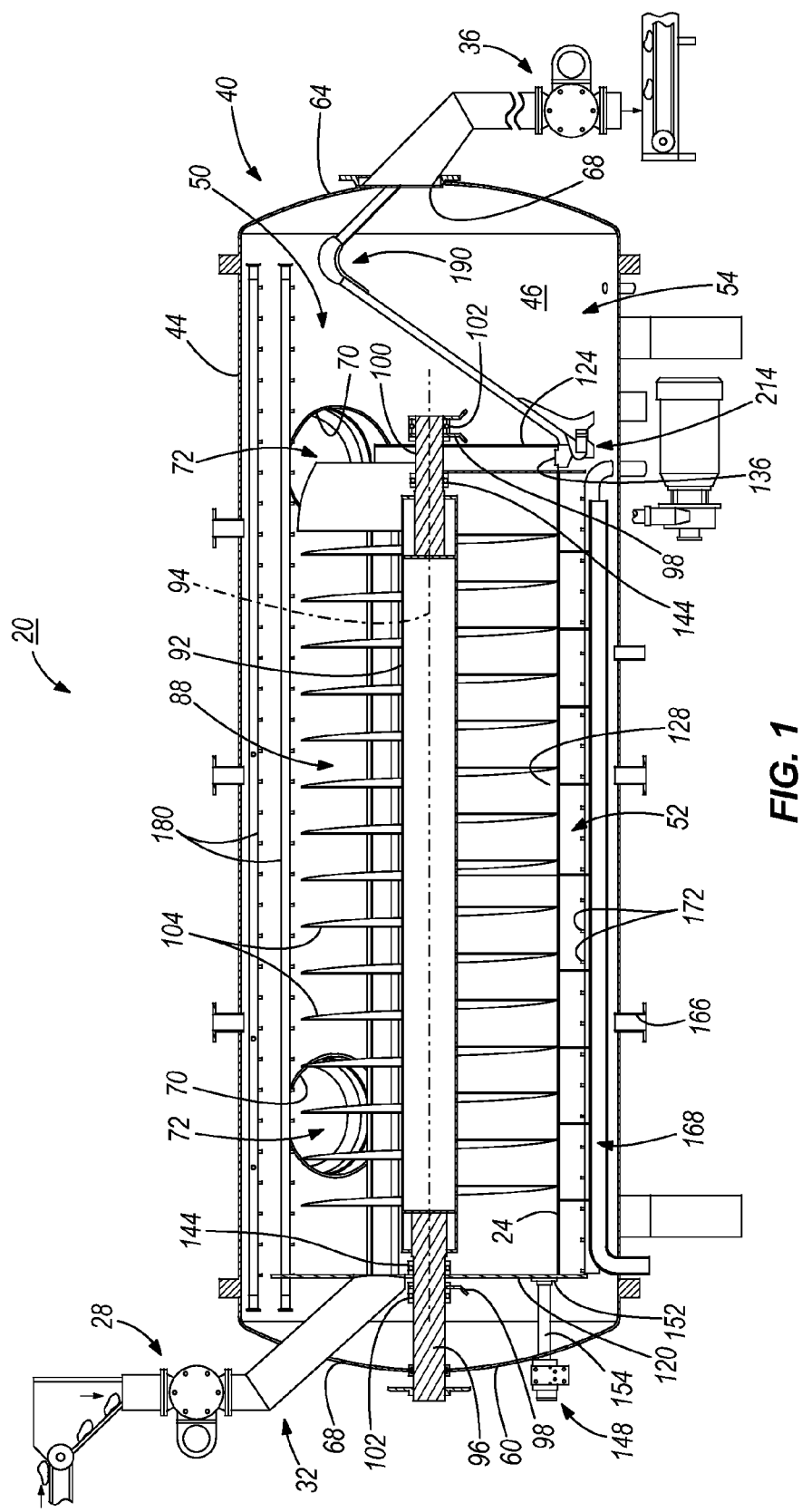
FIG. 1 is a cross-sectional view of a rotary screw blancher.
Figure 2A:
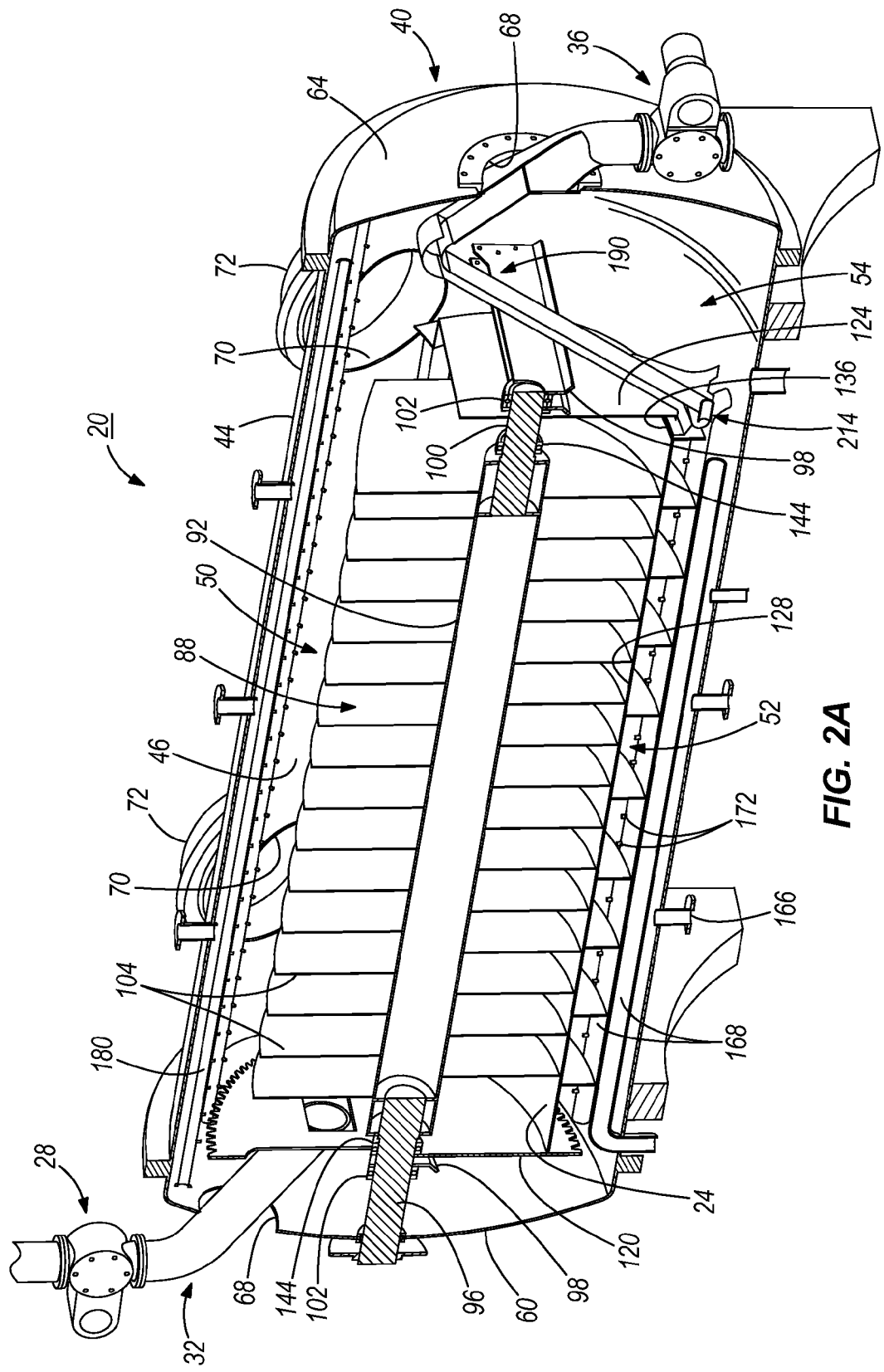
FIG. 2A is a perspective cross-sectional view of the blancher shown in FIG. 1.
Figure 2B:
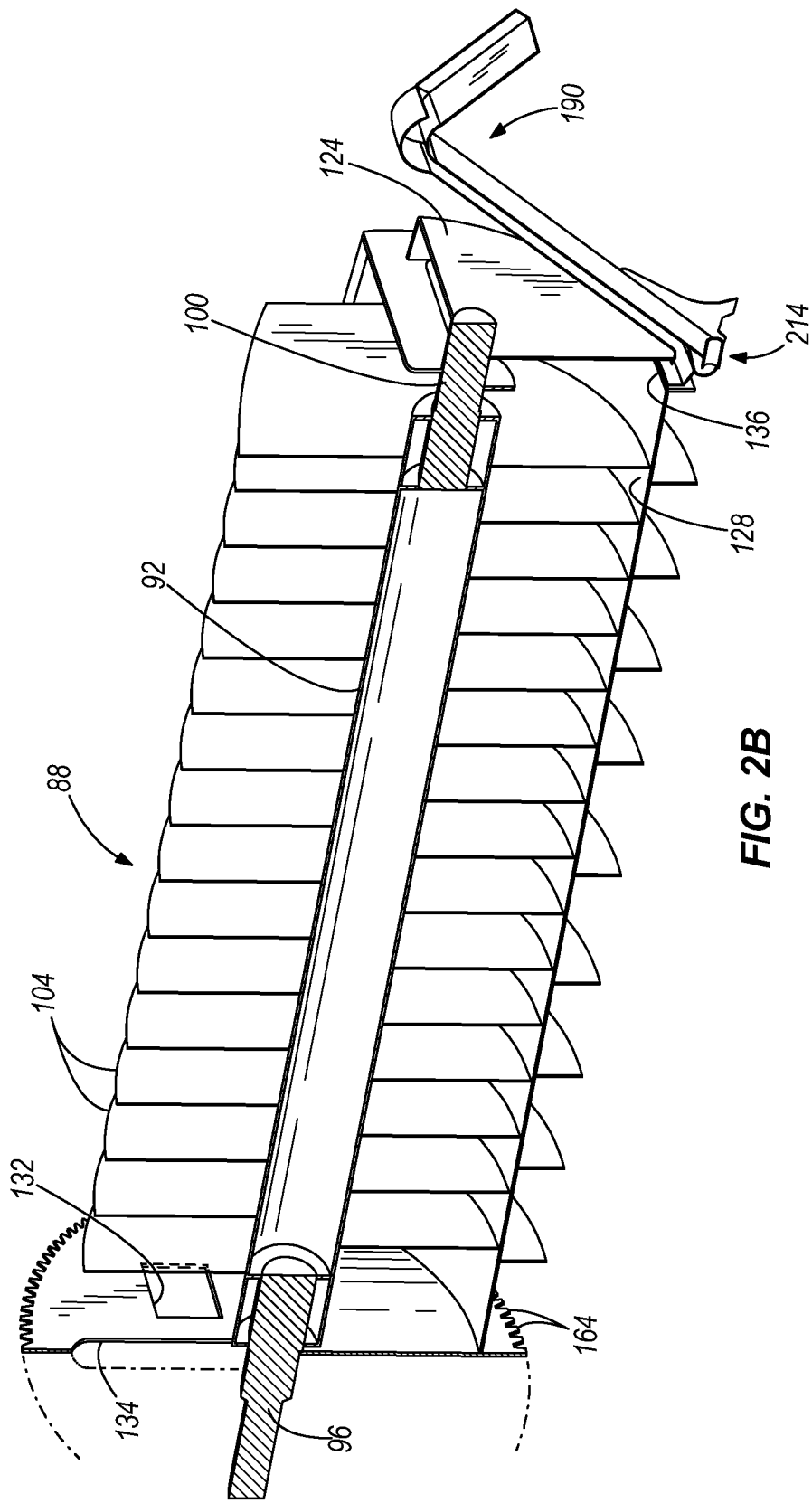
FIG. 2B is a perspective cross-sectional view of the blancher shown in FIG. 2A with portions removed.
Figure 2C:
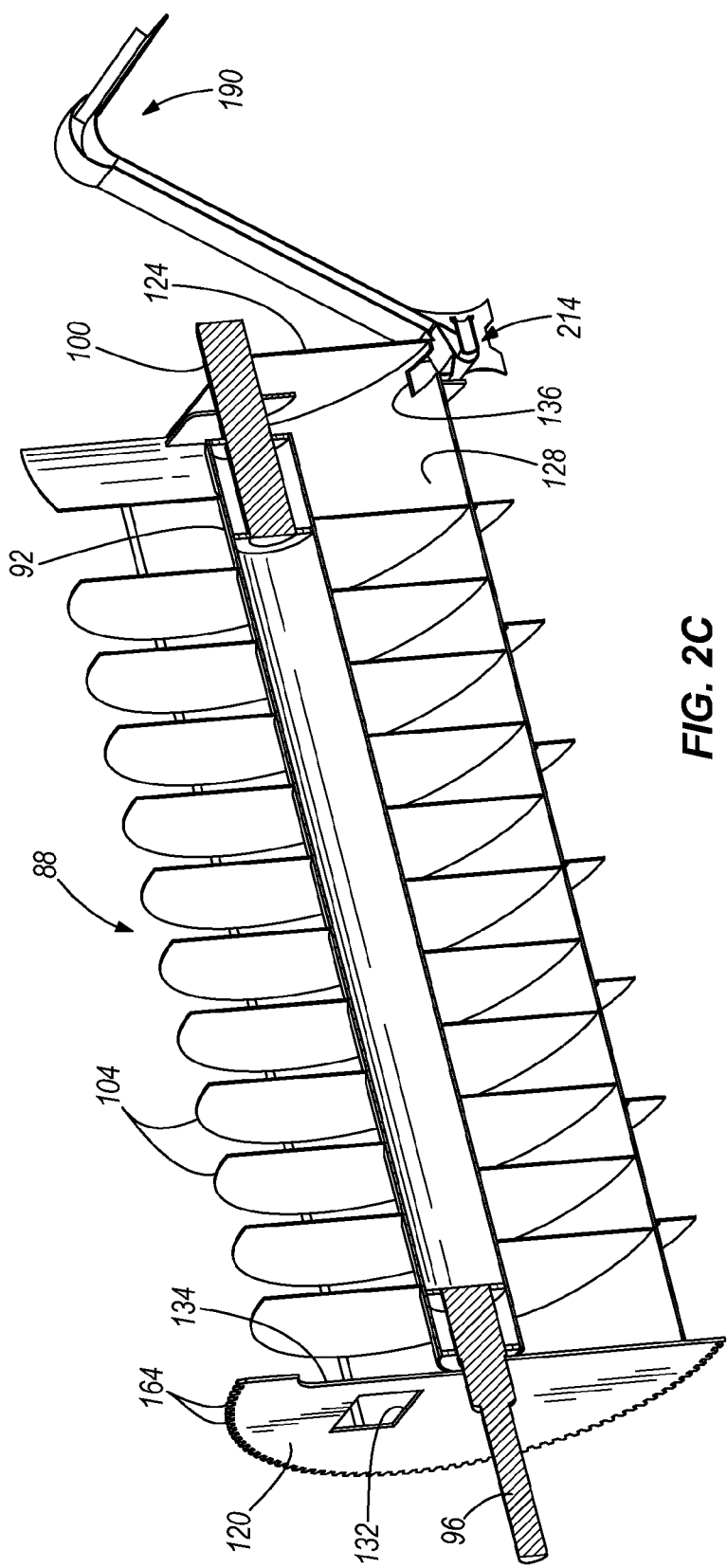
FIG. 2C is another perspective cross-sectional view of the portion of the blancher shown in FIG. 2B.
Figure 2D:
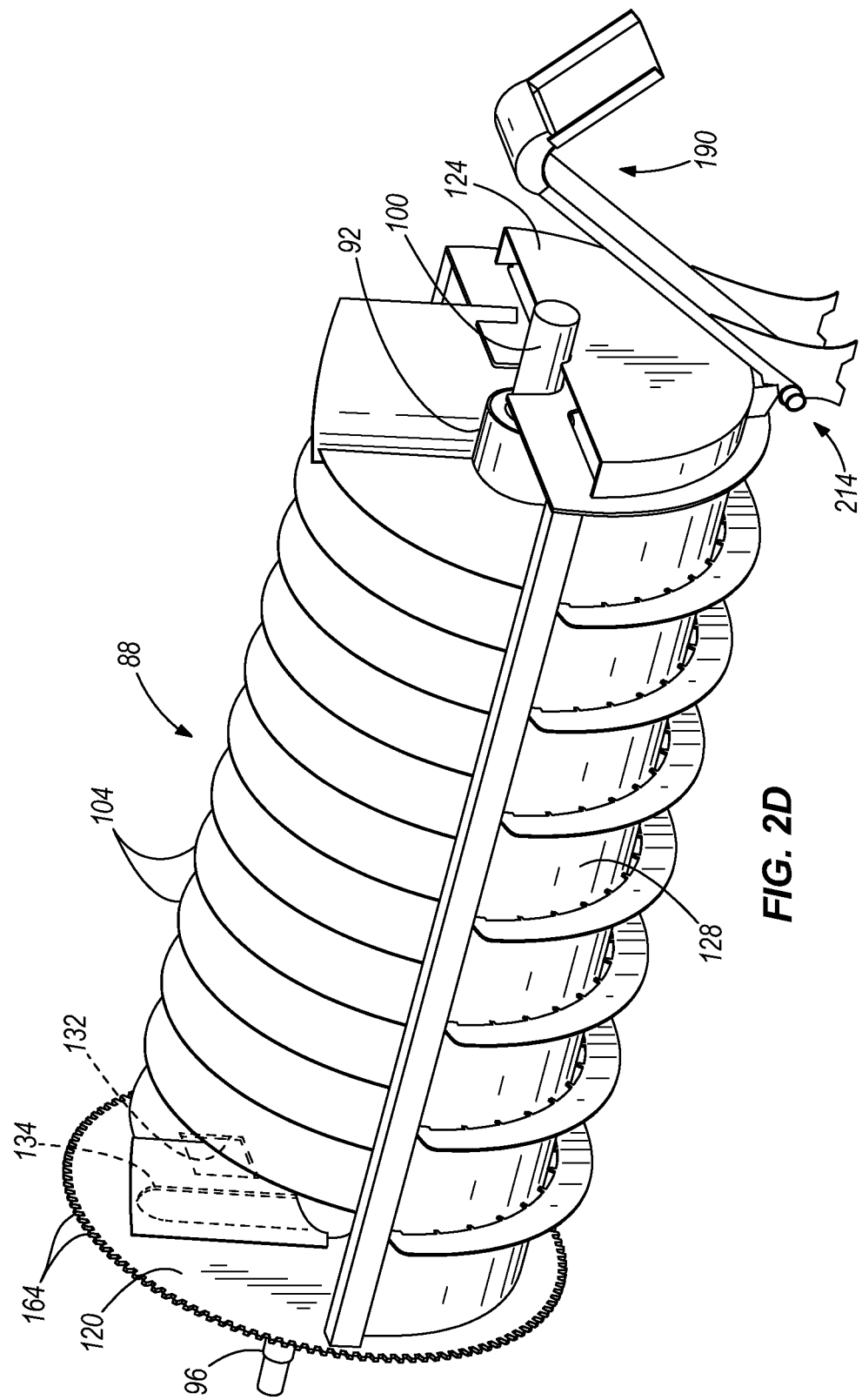
FIG. 2D is a perspective view of the portion of the blancher shown in FIG. 2B.

FIGS. 1 and 2A show a rotary screw blancher 20 for use in a food processing system. The blancher 20, or cooker, uses a heat transfer medium to cook food product that advances through the blancher 20. In other constructions, the blancher 20 may be used for other food processing operations, such as, for example, cooling food product. Features of the blancher 20 may be similar to the blancher shown and described in U.S. patent application Ser. No. 11/216,478, filed Aug. 31, 2005, the entire contents of which were incorporated by reference above.

The blancher 20 includes an open-top screen 24 (FIGS. 1, 2A-2D and 4A-4B) that facilitates cleaning of the screen 24 and blancher 20 and thereby reduces labor and machine downtime between product runs. As shown in FIG. 1, food product is deposited into the blancher 20 at an infeed transfer mechanism 28 at an inlet end 32 and discharged from the blancher 20 at a discharge transfer mechanism 36 at an outlet end 40.

The blancher 20 includes a pressure vessel or tank 44 that is supported by a frame having legs that rest upon a support surface and space the tank 44 above the support surface. The tank 44 is preferably made of stainless steel or another suitable material for food processing applications. The tank 44 has a generally cylindrical side wall 46 defining an inner compartment 50 which, in the illustrated construction, includes a blanching zone 52 and a dewatering zone 54. In other constructions, the inner compartment 50 may include a single compartment or may be divided into more than two compartments.

The tank 44 includes an inlet end wall 60 at the inlet end 32 of the tank 44 and an outlet end wall 64 at the outlet end 40 of the tank 44. Each end wall 60, 64 is connected to the side wall 46 such that the tank 44 is a pressure vessel. In the illustrated construction, the inlet end wall 60 is bolted to the side wall 46 of the tank 44, and the outlet end wall 64 may also be bolted to the side wall 46 of the tank 44. The outlet end wall 64 (and/or the inlet end wall 60) may be hingedly connected to the side wall 46 of the tank 44 to allow easy access to the inner compartment, for example, for cleaning, inspection, etc.

Each end wall 60, 64 defines an opening 68 that communicates with the inner compartment 50 of the tank 44. The infeed transfer mechanism 28 passes food product through the opening in the inlet end wall 60 and the discharge transfer mechanism 36 passes food product through the opening 68 in the outlet end wall 64. Other configurations of the end walls, openings and chutes may be utilized in a further embodiment of the blancher 20.

Openings 70 are provided in the tank side wall 46 to provide access to the inner compartment 50 (e.g., for cleaning, inspections, repair, etc.). An access cover 72 sealingly closes each opening 70 in a manner to maintain pressure in the tank 44 during operation. The opening 70 and cover 72 may have any complementary shape, such as round (as shown), oval, rectangular, etc., as required for access.

In the illustrated construction, the infeed transfer mechanism 28 and the discharge transfer mechanism 36 are pressure-limiting transfer mechanisms. The transfer mechanisms 28, 36 may be similar to the air lock mechanism disclosed in U.S. Pat. No. 6,187,360, issued Feb. 13, 2001, the entire contents of which are hereby incorporated by reference. In other constructions (not shown), the pressure-limiting transfer mechanism may be another type of air lock mechanism, such as, for example, a dual butterfly air lock mechanism.

As shown in FIG. 1, the infeed transfer mechanism 28 is fixed to the inlet end wall 60 and communicates through the opening 68 in the inlet end wall 60 to feed food product into the blanching zone 52. The infeed transfer mechanism 28 provides a sealed inlet through which food product passes to enter the blancher 20 while maintaining or helping to maintain a sufficient seal such that the blancher 20 can be positively pressurized.

Likewise, the discharge transfer mechanism 36 is fixed to the outlet end wall 64 and communicates through the opening 68 in the outlet end wall 64 to remove food product from the dewatering zone 54. The discharge transfer mechanism 36 provides a sealed outlet or a sealed discharge through which food product exits the blancher 20, for example, for further processing, packaging etc., while maintaining or helping to maintain a sufficient seal such that the blancher 20 can be positively pressurized. In some constructions, the discharge transfer mechanism 36 may discharge the food product onto, for example, a cooling or drying rack, a transport device such as a conveyor belt or Ferris wheel-type apparatus, or another food processing system separate from the illustrated blancher 20.

Figure 3:
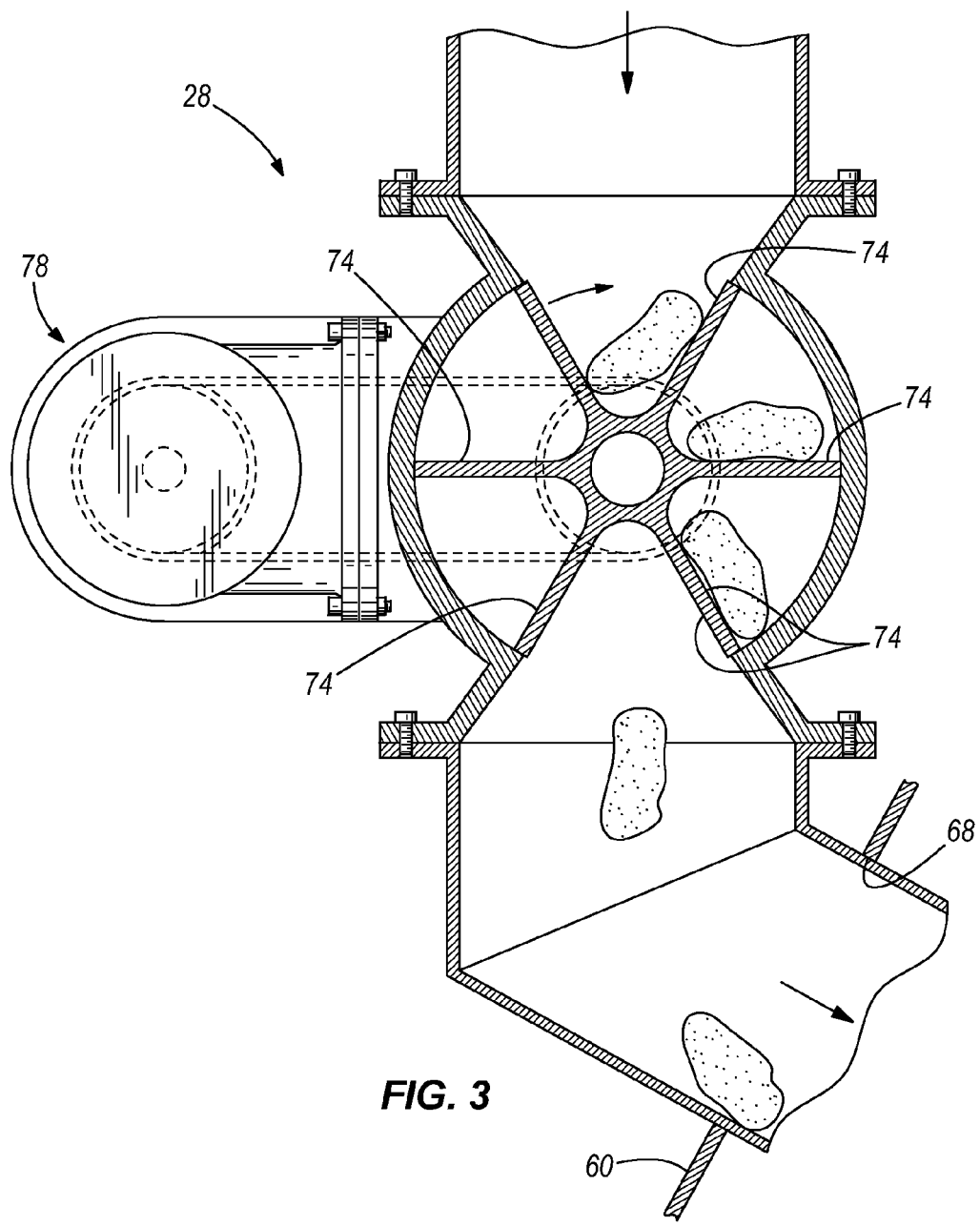
FIG. 3 is a partial cross-sectional view of a pressure-limiting transfer mechanism for use with the blancher shown in FIG. 1.

FIG. 3 illustrates the air-lock food product handling apparatus used for the transfer mechanisms 28, 36. In the illustrated construction, the transfer mechanisms 28, 36 each generally include a sealed rotary valve constructed and arranged to receive at least one food product and to transport the received food product between the interior and the exterior of the blancher 20 while maintaining the seal of the blancher 20. Because, in the illustrated construction, the transfer mechanisms 28, 36 are substantially similar, only the infeed transfer mechanism 28 will be described in detail.

The infeed transfer mechanism 28 includes a plurality of spaced apart and substantially sealed movable chambers 74 in the form of a rotary paddle-wheel, a rotary wheel, a rotor, etc., movably supported in a housing. Each chamber 74 of the infeed transfer mechanism 28 is constructed and arranged to receive at least one food product and to transport the received food product to the interior of the blancher 20 while maintaining the seal of the blancher 20.

A drive arrangement 76, including a motor and a drive assembly, rotates the chambers 74. As shown in phantom in FIG. 3, the drive assembly may include a flexible connecting member (e.g., a belt, a chain, another type of connector, etc.) and a pair of sprockets. Suitable commercially available sealed rotary valves include one or more of model numbers 375, 500, 750, and 1250 convey-through and/or drop-through sealed rotary valves made by Nu-Con Limited of Hopkins, Minn. 55343. The components of the rotary valve are made of a food-grade material, such as stainless steel. An example of a suitable food-grade stainless steel is 316 stainless steel. Generally, the rotary valves have the capability of permitting at least about 20,000 pounds of food product per hour and as much as 50,000 pounds per hour of food product to enter and/or exit the blancher 20 such that processing of the food product by the blancher 20 is essentially continuous.

As shown in FIG. 3, in the infeed transfer mechanism 28, food product enters the uppermost chamber 74 (e.g., at the 12 o'clock position) which is open to the atmosphere. The chamber 74 is rotated to a discharging position (e.g., the lowermost position (the 6 o'clock position)) which is open to the inner compartment 50 through the opening 68 in the inlet end wall 60.

As shown in FIG. 1, the discharge transfer mechanism 36 is inverted relative to the infeed transfer mechanism 28 and, therefore, operates in the reverse manner. Food product exits the tank 44 and enters the uppermost chamber 74 (e.g., at the 12 o'clock position) which is open to the inner compartment 50 through the opening 68 in the outlet end wall 64. The chamber 74 is rotated to a discharging position (e.g., the lowermost position (the 6 o'clock position)) in which the chamber 74 is open to the exterior of the blancher 20 (e.g., to the atmosphere, to a packaging system, to another food processing apparatus for further processing, etc.).

While the transfer mechanisms 28 and 36 are illustrated with a vertical portion communicating with the atmosphere, in other constructions (not shown), this portion may be angled, for example, aligned with the portion communicating with the inner compartment 50.

As shown in FIGS. 1 and 2A, an auger 88, or helical screw, is disposed within the blanching zone 52 and rotates to advance food product from the inlet end 32 of the tank 44 toward the outlet end 40 of the tank 44. The auger 88 includes a shaft 92 that extends along an axis 94 between the inlet end wall 60 and an intermediate portion of the tank 44. To support the auger 88, a first end 96 of the shaft 92 is rotatably supported by a first mounting bar 98 proximate the inlet end wall 60, and a second end 100 of the shaft 92 is rotatably supported by a second mounting bar 98 proximate the intermediate portion of the tank 44. Each mounting bar 98 is connected to the side wall 46 of the tank 44 and spans the width of the tank 44. Bearings 102 are provided to support the shaft 92 on the mounting bars 98.

The auger 88 includes a plurality of axially spaced apart and interconnected flights 104 that spiral substantially the length of the blanching zone 52. As the auger 88 rotates, the flights 104 move food product from the inlet end 32 of the tank 44 toward the outlet end 40 of the tank 44.

The first end 96 of the shaft 92 extends through the inlet end wall 60, and a seal (not shown) is provided to maintain a sufficient seal such that the blancher 20 can be positively pressurized. The blancher 20 includes an external drive assembly (not shown) interconnecting the auger shaft 92 with a main drive motor (not shown) which drives rotation of the auger 88. The infeed transfer mechanism 28 may be offset from a centerline of the tank 44 to accommodate the drive assembly/motor of the auger 88. However, in other constructions, the infeed transfer mechanism 28 and the drive assembly/motor may be reconfigured to allow the infeed transfer mechanism 28 to be positioned along the center line of the tank 44.

The open-top screen 24 is mounted in the blanching zone 52 of the inner compartment 50 and is configured to cooperate with the auger 88 to transport food product received in the blancher 20 from the inlet end 32 toward the outlet end 40 of the tank 44. As shown in more detail in FIGS. 4A-4B, the screen 24 includes an inlet end wall 120 proximate the inlet end wall 60 of the tank 44 and an outlet end wall 124 proximate the outlet end 40 of the tank 44.

Figure 4A:
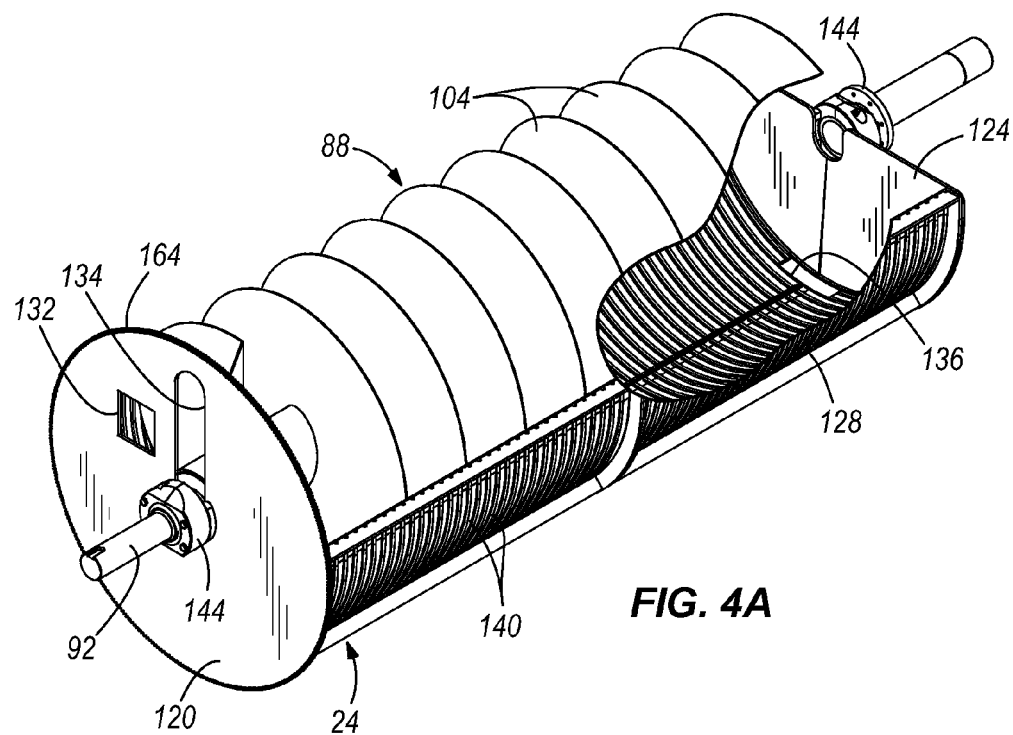
FIGS. 4A-4B are perspective views of one construction of a screen of the blancher shown in FIG. 1 and illustrated in a first, processing position and in a second, cleaning position, respectively.
Figure 4B:
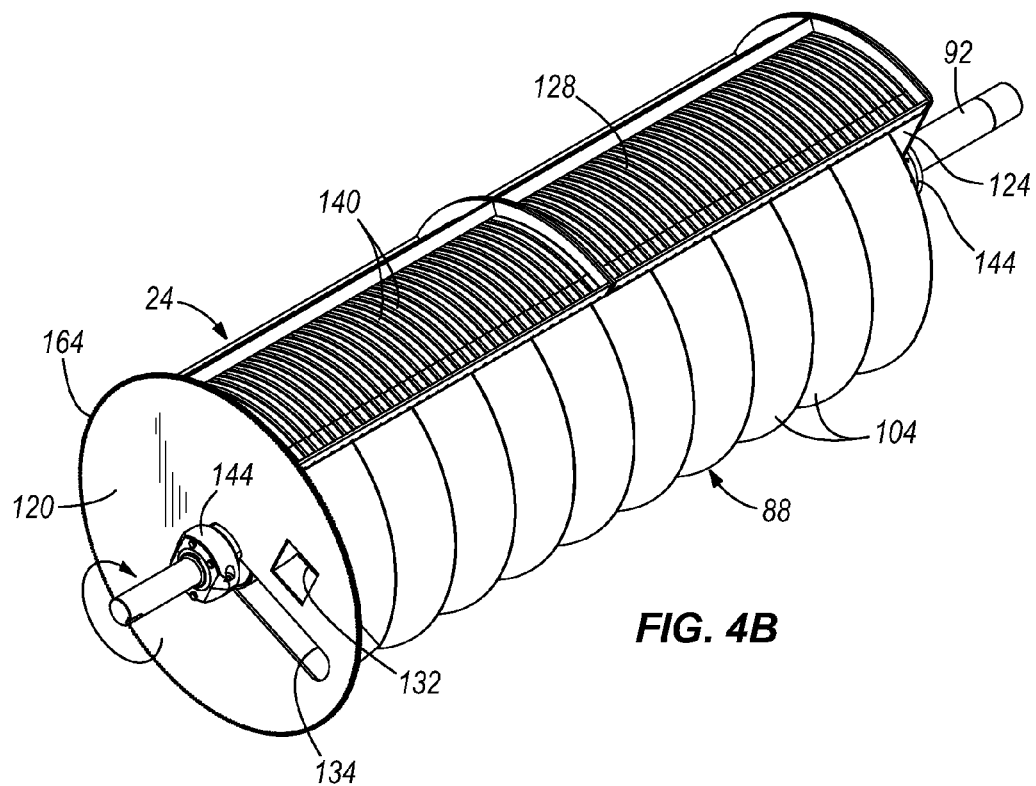

As shown in FIGS. 4A-4B, a generally semi-cylindrical and perforate sidewall 128 substantially extends between the screen end walls 120, 124. The inlet end wall 120 extends radially beyond the outer circumference of the sidewall 128, and the outlet end wall 124 has substantially the same circumference as the sidewall 128.

As shown in FIGS. 2A-2D, the inlet end wall 120 of the screen 24 defines an opening 132 for receiving food product from the infeed transfer mechanism 28. The inlet end wall 120 also defines a slot 134 for receiving the shaft 92 of the auger 88 so that the auger 88 can be more easily installed into and removed from the screen 24.

The sidewall 128 of the screen 24 defines an outlet opening 136 proximate the outlet end wall 124 to facilitate transfer of food product from the screen 24 to the transfer mechanism 190 (discussed below). The screen 24 is a wire screen that defines a plurality of small slots that extend completely through the sidewall 128 to allow heat transfer medium to pass to the inner compartment 50, through the sidewall 128 and into the screen 24. In another construction, perforations in the sidewall 128 of the screen 24 consist of a plurality of small diameter bores or slots, or laser cut holes or slots.

As shown in FIGS. 1 and 2A, the screen 24 is supported by the shaft 92 of the auger 88 and includes two screen bearings 144 through which the auger shaft 92 passes. The auger shaft 92 also maintains alignment of the screen 24. An external screen drive 148, including a brake motor, is drivingly connected to the screen 24 by a screen sprocket 152. The screen sprocket 152 is mounted to a shaft 154 extending from the screen drive 148 and includes a gear plate (not shown) sandwiched between two plates (not shown). An outer circumference of the inlet end wall 124 of the screen 24 includes (see FIG. 4A) gear teeth 164 that matingly engage the gear plate of the screen sprocket 152. The screen sprocket 152 also prevents lateral movement of the screen 24 within the tank 44.

In use during food processing, the screen 24 is fixed (see FIGS. 1, 2A, 2D and 4A) relative to the tank 44, and the auger 88 rotates within the screen 24 to advance food product from the inlet end 32 of the tank 44 toward the outlet end 40. The brake motor holds the screen 24 in place and prevents rotation of the screen 24 with the auger 88. FIGS. 1 and 2A illustrate the screen 24 and auger 88 when the screen 24 is fixed in a first, food processing position to advance food product. In this position, the screen 24 is generally positioned in the bottom of the blanching zone 52 and below the auger 88.

To clean the screen 24 and portions of the tank 44 located below or behind the screen 24, the brake motor is released and the screen drive 148 rotates the shaft and screen sprocket 152, which thereby rotates the screen 24. The screen 24 is then rotated from the food processing position (FIGS. 1, 2A, 2D and 4A) about the bearings 144 (e.g., about the longitudinal axis 94 defined by the auger support shaft 92) to and/or through a second, cleaning position (shown in FIG. 4B). In this position (FIG. 4B), the screen 24 is pivoted away from the bottom of the blanching zone 52 and may be pivoted to a position generally above the auger 88. The auger 88 may or may not continue rotating during rotation of the screen 24.

Rotation of the screen 24 deposits food product remnants to a bottom of the tank 44 and provides access to a bottom of the screen 24 and the bottom of the tank 44 to clean contaminant accumulation. To facilitate cleaning, the screen 24 is held in the second, cleaning position (FIG. 4B) by the brake motor. Once cleaning is complete, the screen 24 is rotated back to the food processing position (FIGS. 1, 2A, 2D and 4A) by the screen drive 148 and held in place relative to the tank 44 by the brake motor. In other constructions, the screen 24 may also be moved during cleaning to facilitate cleaning of different parts of the screen 24, the tank 44 and/or the auger 88.

In the illustrated construction, the screen 24 is configured to rotate 360° about the bearings 144 (although in FIG. 4B the screen 24 is shown rotated approximately 120°). In a further construction, the screen 24 may rotate at most 180°. In yet another construction, the screen 24 may be pivotable about an axis other than the axis 94.

In another construction, the screen 24 may include, for example, movable panels or portions (e.g., sliding along the axis 94) to facilitate cleaning of the screen 24 and other components within the inner compartment 50 of the tank 44. In a further construction, the screen 24 may be held in position in the tank 44 by means other than the brake motor.

In the illustrated construction, the screen 24 and the auger 88 are configured and adapted to maintain a tight tolerance between the two, which will not decrease a clearance between the screen 24 and the auger 88 as the screen bearings 144 wear. A clearance gap between the sidewall 128 and the auger flights 104 may be between about 0.03 inches and about 0.5 inches, and, in some constructions, between about 0.03 inches and 0.1 inches. In the illustrated construction, the clearance gap is about 0.06 inches.

The tight tolerance between the screen 24 and the auger 88 reduces damage to food product passing through the screen, because the small clearance gap prevents even small size food product, such as rice, beans, noodles, etc., from becoming stuck between the screen 24 and the auger 88. Further, the clearance gap is sufficient to prevent metal-to-metal contact between the screen 24 and the auger 88, as the auger 88 rotates, which introduces contaminant metal particles into the food product.

Heat transfer medium is supplied to the inner compartment 50 of the tank 44 from a supply source, such as being recycled from the inner compartment 50, by an inlet (not shown) disposed in the inner compartment 50. An external source of heat transfer medium (not shown) initially fills the inner compartment 50, as desired. A sensor (not shown) is provided in the inner compartment 50 to determine whether sufficient heat transfer medium is provided. If the sensor determines that the heat transfer medium is below the desired level, additional heat transfer medium is provided from the external source.

Heat transfer medium is drained from the inner compartment 50 through an outlet, such as a drain tube 166. In one construction, there is a constant flow of heat transfer medium into and out of the blancher 20 through the inlet and the outlet, which may also assist in cleaning of the blancher 20.

The heat transfer medium comprises any number of liquids, non-liquids or a combination liquid/non-liquid medium, including, but not limited to water, steam, heated gas or vapor, water and steam, water and water vapor, or the like. In the illustrated construction, with a transfer mechanism 190, as described below, the heat transfer medium is a liquid medium. In another embodiment, the heat transfer medium is supplied to the inner compartment 50 by a manifold (e.g., a manifold 168, as described below) disposed in the inner compartment 50 and positioned in the bottom of the tank 44, which directly injects steam into the inner compartment 50.

The screen 24 is constructed and arranged to receive heat transfer medium such that the heat transfer medium can surround and contact the food product within the screen 24. In the screen 24, the heat transfer medium blanches or cooks the food product as the food product is advanced through the screen 24 by the auger 88.

The rotary blancher 20 includes (see FIGS. 1 and 2A) one or more manifolds 168 positioned in the bottom portion of the tank 44. The manifold(s) 168 include a plurality of injectors 172, or agitators, directed towards the screen 24. Directed flows, jets or streams of fluid are discharged from the injectors 172 into the blanching zone 52 to displace food product in the screen 24 and to help increase heat transfer. Fluid is discharged from the injectors 172 with sufficient force to pass through the screen sidewall 128 and displace the food product. The discharged fluid may keep the food product off the screen sidewall 128, break up clumps of food product, protect the food product from damage, reduce temperature variation in the food product, etc.

In one construction, the injectors 172 are positioned to discharge fluid toward the screen interior and generally toward the center of the screen 24. In another construction, at least some of the injectors 172 are aimed at a target point where food product is known to congregate while the auger 88 is rotating. In still another construction, the heat transfer medium is distributed through the manifold 168 and injectors 172 also. One example of the injectors 172 is further described in U.S. Pat. Nos. 6,214,400 and 6,234,066, the entire contents of both of which are hereby incorporated by reference.

Fluid is supplied to the manifold(s) 168 from a header (not shown), which receives fluid from a supply source, such as being recycled from the inner compartment 50 or from an external source. In one construction, the fluid source comprises a source of liquid, such as water, and, in another construction, the fluid source comprises a source of gas, such as steam.

In the illustrated construction, one manifold 168 is positioned in the bottom of the tank 44 generally along the centerline (the 6 o'clock position when viewed from an end of the tank 44), and another manifold 168 is positioned to one side of the centerline (toward the 7 o'clock position when viewed from the inlet end 32 of the tank 44). In other constructions (not shown), the manifold(s) 168 may be positioned at another location in the tank 44 (e.g., to either side of the centerline of the tank 44) to achieve the desired affect(s) on food product in the screen 24. In still other constructions, only one or more than two manifolds 168 are provided, each manifold 168 including a set of injectors 172.

To clean the tank 44, cleaning fluid is supplied to the inner compartment 50 of the tank 44 from a supply source by one or more clean-in-place manifolds 180 (FIGS. 1 and 2A) disposed in the inner compartment 50 and positioned adjacent the upper portion of the tank 44. External headers (not shown) may supply cleaning fluid to the manifold(s) 180 in the inner compartment 50. In the illustrated construction, cleaning chemicals are added to fluid in the inner compartment 50, and the mixture is supplied to two manifolds 180 to be dispersed in the tank 44. In other constructions, fewer or more manifolds 180 may be used.

Once the screen 24 is rotated to and/or through the second, cleaning position (FIG. 4B), cleaning fluid is discharged into the inner compartment 50 to clean the tank 44, the auger 88, and the screen 24 of contaminants, and the fluid and contaminants are drained from the inner compartment 50 through the outlet, such as the drain tube 166. Once cleaning is complete, the screen 24 is rotated back to the first, food processing position (FIGS. 1, 2A, 2D and 4A) by the screen drive 148 and held in place relative to the tank 44 by the brake motor.

In the illustrated construction, the screen 24 is generally held in the second, cleaning position (FIG. 4B) as the discharged cleaning fluid removes contaminants from the screen 24. In other constructions, the screen 24 may also be moved during cleaning to facilitate cleaning of different parts of the screen 24, the tank 44 and/or the auger 88.

The cleaning fluid may be any number of liquids or a combination liquid/non-liquid medium, including, but not limited to water, water and steam, water and water vapor, cleaning chemicals, etc. Further, the cleaning manifolds 180 may be supplied with the same fluid as the manifolds 168.

Figure 5A:
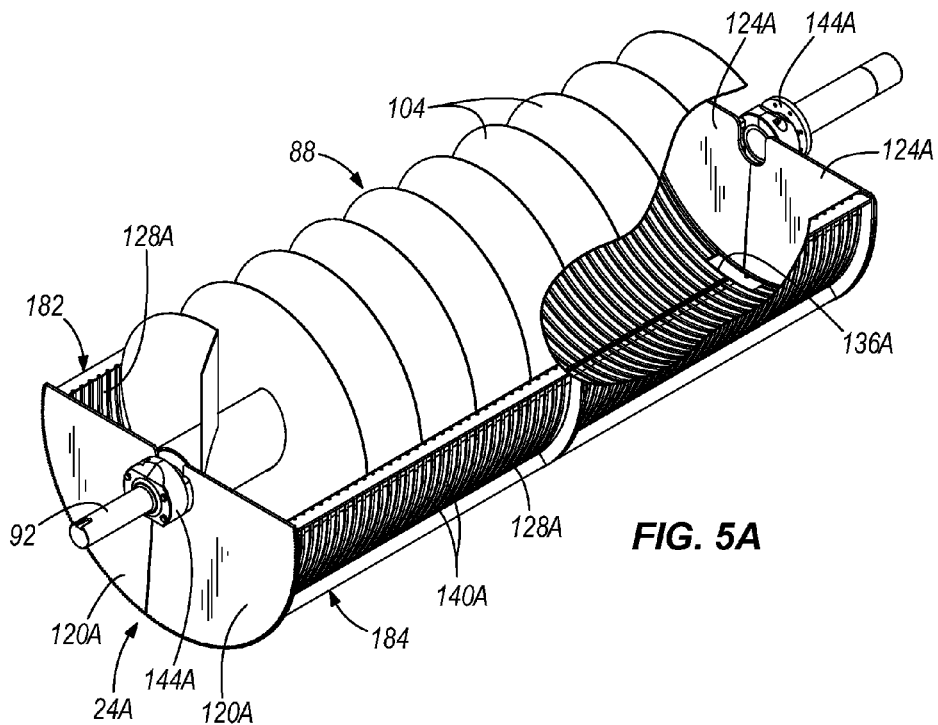
FIGS. 5A-5B are perspective views of another construction of a screen of the blancher shown in FIG. 1 and illustrated in a first, processing position and in a second, cleaning position, respectively.
Figure 5B:
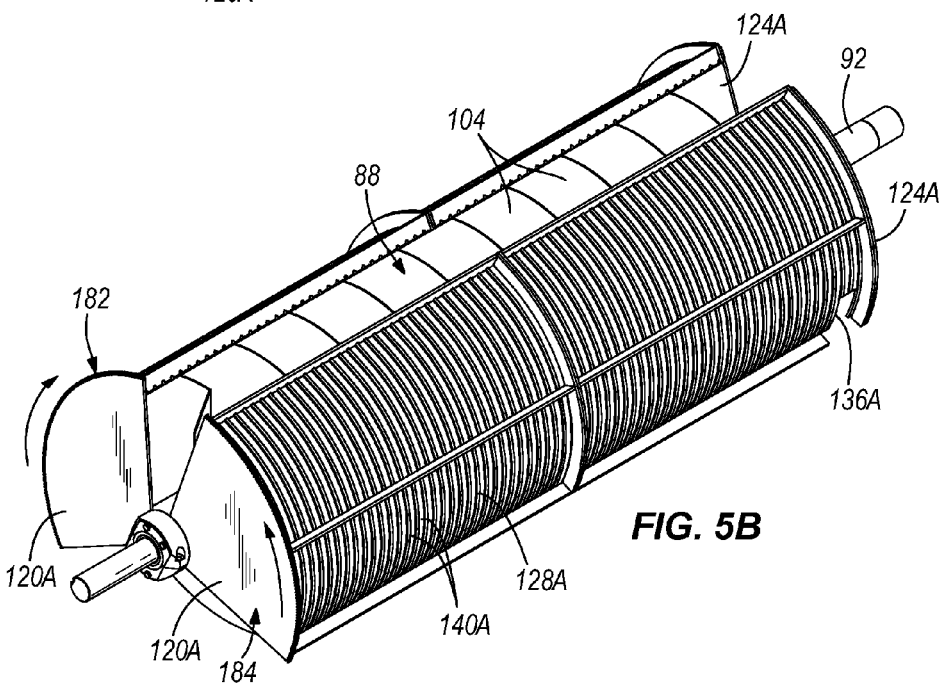

FIGS. 5A-5B illustrate another construction of an open-top screen 24A for use with the rotary blancher 20 and the auger 88. The screen 24A is similar to the screen 24 described above and shown in FIGS. 4A-4B. Common elements have the same reference number "A". Reference is made to the description of the screen 24 above for details of the structures and operation, as well as alternatives to the structures and operation, of the screen 24A not specifically discussed herein.

In a manner similar to the screen 24 (see FIGS. 1 and 2A), the screen 24A is mounted in the inner compartment 50 of the tank 44 and is configured to transport food product received in the blancher 20 from the inlet end 32 to the intermediate wall 62. As shown in FIGS. 5A-5B, the screen 24A includes a generally quadrant shaped first portion 182 and a generally quadrant shaped second portion 184 that are attached together to form the generally semi-cylindrical screen 24A. In other constructions (not shown), the screen 24A may include more than two portions and/or may have a shape other than semi-cylindrical.

Each screen portion 182, 184 includes an inlet end wall 120A positioned proximate the inlet end 32 of the tank 44 and an outlet end wall 124A positioned proximate the intermediate wall 62. The end walls 120A and 124A are solid to keep food product within the screen 24A.

The screen 24A is supported by the support shaft 92 of the auger 88 and includes two screen bearings 144A through which the auger shaft 92 passes. As shown in FIG. 4A, the inlet end walls 120A and the outlet end walls 124A of the screen portions 182, 184 each jointly define an opening for the shaft 92 of the auger 88. In one construction, a screen drive (not shown but similar to the screen drive 148), including a brake motor, is drivingly connected to each screen portion 182, 184 by a screen sprocket (not shown but similar to the screen sprocket 152) to alternatively hold the screen 24A in the first, food processing position and rotate the screen portions 182, 184 to the second, cleaning position.

Each screen portion 182, 184 includes a perforate sidewall 128A that substantially extends between the screen end walls 120A, 124A. The sidewall 128A is a wire screen that defines a plurality of small slots 140A that extend completely through the sidewall 128A to allow heat transfer medium to pass from the blanching zone 52, through the sidewall 128A and into the screen 24A. In another construction, perforations in the sidewall 128A of the screen portions 182, 184 consist of a plurality of small diameter bores or laser cut holes. The screen portions 182, 184 cooperate to define an opening 136A through the screen sidewall 128A to facilitate transfer of food product from the screen 24A to the transfer mechanism 190. Portions of the auger 88 are removed in FIG. 5A to better show the opening 136A.

In use for food processing, the screen portions 182, 184 are secured together and fixed (see FIG. 5A) relative to the tank 44 such that the auger 92 rotates within the screen 24A to advance food product from the inlet end 32 of the tank 44 toward the outlet end wall 124A. One or more brake motors (not shown) hold the screen 24A in place (as shown in FIG. 5A) and prevent rotation of the screen 24A with the auger 88. FIG. 5A illustrates the screen portions 182, 184 and the auger 88 when the screen 24A is fixed in a first, food processing position to advance food product. In this position, the screen 24A is generally positioned in the bottom of the blanching zone 52 and below the auger 88.

To clean the screen portions 182, 184 and portions of the tank 44 located below or behind the screen 24A, the screen portions 182, 184 are released (e.g., by releasing the brake motor(s)) and the screen drive rotates the shaft 92 and the screen sprockets, which thereby rotates the screen portions 182, 184. The screen portions 182, 184 are then rotated from the food processing position (FIG. 5A) about the bearings 144A, or a longitudinal axis defined by the auger support shaft 92, to a second, cleaning position (shown in FIG. 5B). In this position (FIG. 5B), the screen portions 182, 184 are pivoted away from the bottom of the blanching zone 52 and may be pivoted to a position generally above the auger 88. The auger 88 may or may not continue rotating during rotation of the screen portions 182, 184.

Rotation of the screen portions 182, 184 deposits food product remnants to the bottom of the tank 44 and provides access to the bottom of the screen portions 182, 184 and the bottom of the tank 44 to clean contaminant accumulation. The screen portions 182, 184 are held in the second, cleaning position by the brake motor(s). Once cleaning is complete, the screen portions 182, 184 are rotated back to the food processing position (FIG. 5A) and secured relative to the tank 44.

In the illustrated construction, the screen portions 182, 184 are configured to rotate about 180° in opposite directions about the bearings 144A. However, in FIG. 5B, the screen portions 182, 184 are each shown rotated about 45°. In a further construction, the screen portions 182, 184 may rotate in the same direction or may rotate more than 180°. In another construction, the screen portions 182, 184 may be fixed relative to the tank 44 by means other than the brake motor(s).

As shown in FIGS. 1 and 2A, the blancher 20 also includes a transfer mechanism 190 to transfer food products from the blanching zone 52 (from the screen 24), through the dewatering zone 54 and out of the blancher 20. The illustrated transfer mechanism 190 may be similar to the transfer mechanisms shown and described in U.S. patent application Ser. No. 12/174,297, filed Jul. 16, 2008, and in U.S. patent application Ser. No. 12/501,649, filed Jul. 13, 2009, the entire contents of both of which are hereby incorporated by reference. The illustrated transfer mechanism 190 may also be similar to the cooling mechanisms shown and described in U.S. patent application Ser. No. 12/501,758, filed Jul. 13, 2009, the entire contents of which is also hereby incorporated by reference.

Figure 6A:
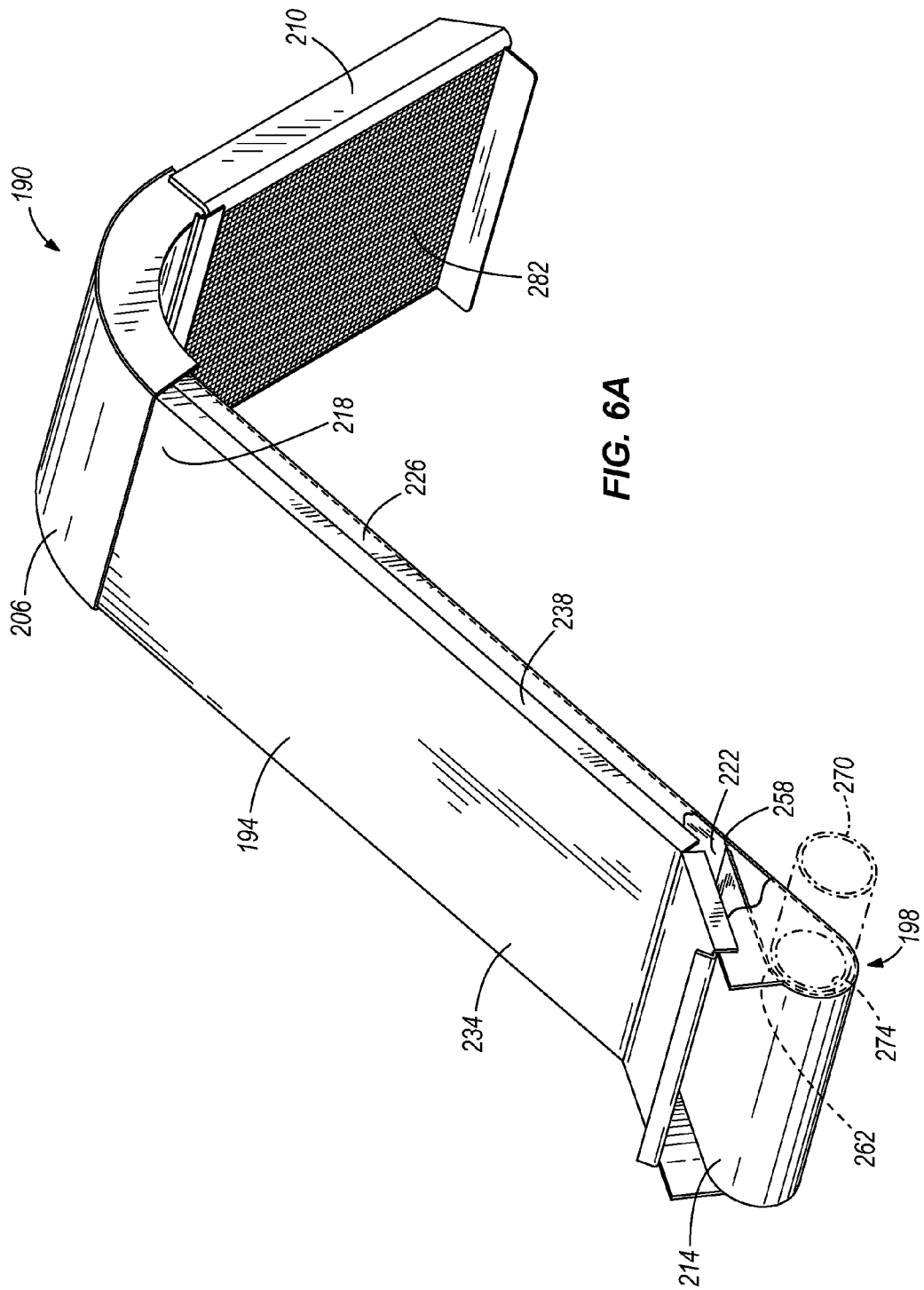
FIGS. 6A-6B are views of a transfer mechanism for use with the blancher shown in FIG. 1.
Figure 6B:
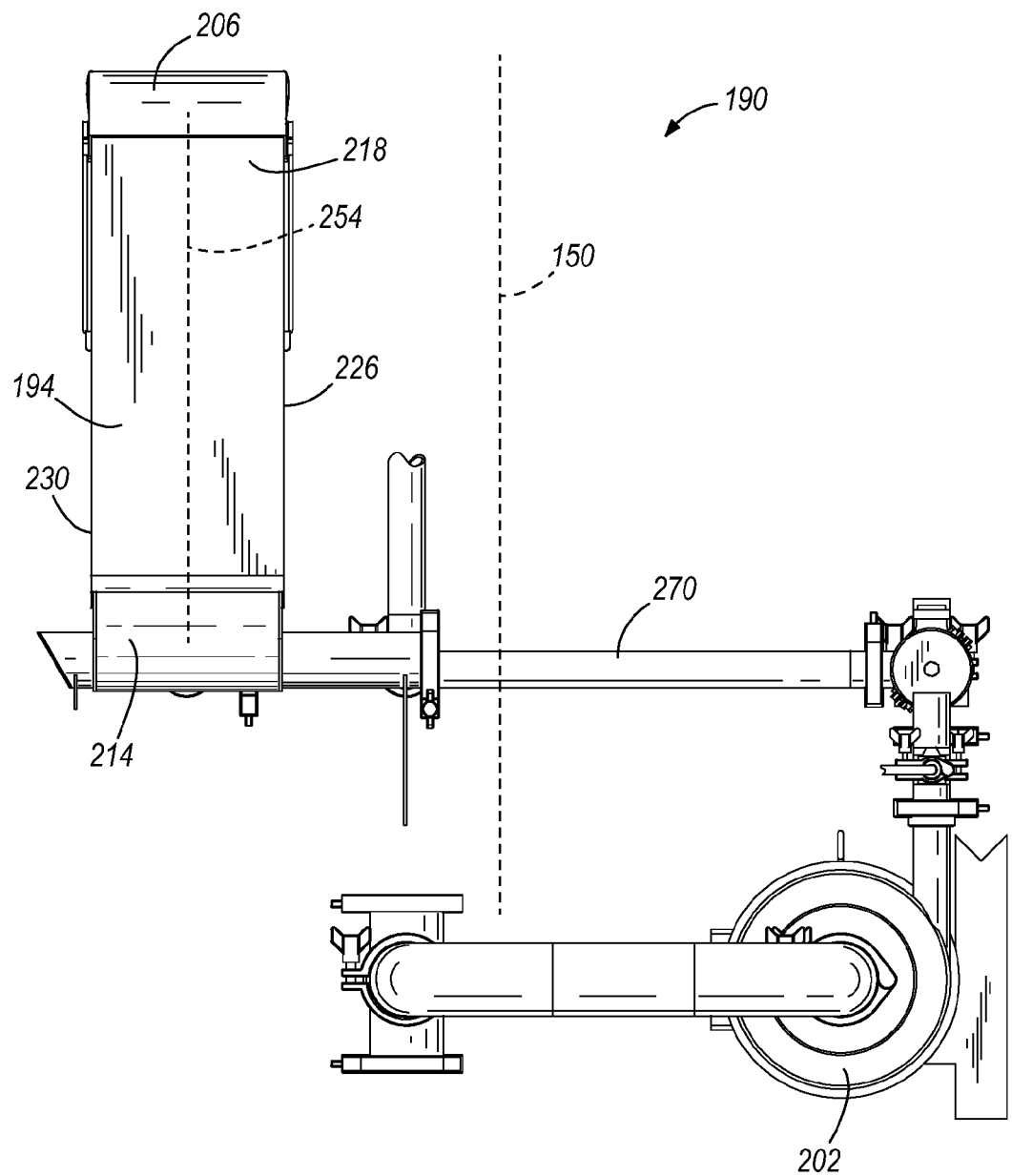

In general, the transfer mechanism 190 lifts food product within the blanching zone 52 (from the screen 24) and discharges the food product to the discharge transfer mechanism 36. FIGS. 6A-6B illustrate a construction of the transfer mechanism 190 for use in the blancher 20. The illustrated transfer mechanism 190 is generally positioned in the dewatering zone 54 of the tank 44. The transfer mechanism 190 includes a conduit 194, a fluid discharge 198, a pressurized fluid source 202 (FIG. 6B), a convex guide member 206, and a dewatering member 210. The conduit 194 extends from an inlet portion 214, communicating with (see FIGS. 1 and 2A) the opening 136 in the screen sidewall 128, to an outlet portion 218, communicating with the convex guide member 206.

The inlet portion 214 fits closely with the opening 136 in the screen sidewall 128 so that food product can only move into the conduit 194 from the screen 24 and cannot move out of the screen 24 into the inner compartment 50. As mentioned above, the outlet end wall 124 has substantially the same circumference as the screen sidewall 128 such that the end wall 124 and the transfer mechanism 190 do not interfere during food processing or cleaning operations or during movement of the screen 24 between the food processing and cleaning positions.

The conduit 194 includes a lower wall 222 and two side walls 226, 230 integrally formed as a three-sided member. An upper wall 234, or cover, is removably coupled to the side walls 226, 230. In the illustrated construction, the upper wall 234 includes lips 238 extending over portions of the side walls 226, 230 and is partially captured under the convex guide member 206 to help retain the upper wall 234 in place. In other constructions, the upper wall 234 may be coupled to the side walls 226, 230 with clamps, fasteners, etc. The walls 222, 226, 230, 234 of the illustrated conduit 194 are arranged such that the conduit 194 has a generally rectangular cross-section. In the illustrated construction, the width of the conduit 194 is substantially constant from the inlet portion 214 of the conduit 194 to the outlet portion 218. In other constructions (not shown), the width of the conduit 194 may change from the inlet end 214 to the outlet end 218.

As shown in FIG. 6B, the conduit defines a central axis 254 extending from the inlet portion 214 to the outlet portion 218. In the illustrated construction, the axis 254 and the conduit 194 are in a central longitudinal plane extending through the tank 44 of the blancher 20. In other constructions, the axis 254 may be offset from and substantially parallel to or oblique to the central longitudinal plane extending through the tank 44.

As shown in FIG. 6A, the fluid discharge includes a slot 258 positioned adjacent to the inlet portion 214 of the conduit 194. The illustrated slot 258 is formed by doubling over a portion of the lower wall 222 to form a generally teardrop-shaped opening 262. The slot 258 helps focus, and thereby pressurize, fluid from the fluid source 202 (FIG. 6B), ensuring the fluid has sufficient flow strength to push food product upwardly through the conduit 194 to the outlet portion 218. The slot 258 provides a continuous discharge of fluid along the entire width of the conduit 194. In the illustrated construction, the slot 258 has a height of approximately 1/8" to help focus and pressurize the fluid. In other constructions, the height of the slot 258 may be relatively larger or smaller (e.g., from about 3/16" to about 1/16") to allow more or less fluid to simultaneously flow out of the slot 258. In still other constructions, the size of the slot 258 may be even larger or smaller depending upon the desired capacity of the transfer mechanism 190.

An outlet pipe 270 of the pressurized fluid source 202 (e.g., a pump) extends through an enlarged portion 274 of the teardrop-shaped opening 262. The outlet pipe 270 directs fluid from the pump 202, through the outlet pipe 270, and out of the slot 258. The fluid discharge 198 and the pump 202 generate a vacuum force at the inlet portion 214 of the conduit 194. The vacuum force helps draw food product from the screen 24, through the opening 136 in the screen sidewall 128 and into the inlet portion 214 such that the pressurized fluid exiting the slot 258 can move the food product toward the convex guide member 206.

In some constructions, the fluid discharge 198 may include two or more slots positioned along the conduit 194. For example, FIG. 7 illustrates a conduit 294 of a fluid transfer mechanism 290 according to another embodiment of the invention. In the constructions shown in FIG. 7, a fluid discharge 298 of the transfer mechanism 290 includes three slots 302, 306, 310 spaced apart along the conduit 294 between an inlet portion 314 and an outlet portion. Each slot 302, 306, 310 is substantially similar to the slot 258 discussed above and is in communication with a separate outlet pipe 318, 322, 326 from a pressurized fluid source.

As shown in FIG. 7, the first slot 302 is directly adjacent to the inlet portion 314 of the conduit 294 (similar to the slot 258 discussed above), the second slot 306 is formed on a lower wall 330 of the conduit 294 downstream of the first slot 302, and the third slot 310 is formed on an upper wall 334 of the conduit 294 downstream of the second slot 306. In other constructions, the relative positioning of the slots 302, 306, 310 may be altered. For example, all of the slots 302, 306, 310 may be positioned along a single wall of the conduit 294 (e.g., either the lower wall 330 or the upper wall 334), or the slots 302, 306, 310 may be positioned on the conduit 294 alternating between the lower wall 330 and the upper wall 334. In further constructions, the fluid discharge 298 may only include two slots either positioned on the same wall of the conduit 294 or on opposite walls. For example, the fluid discharge 298 may include the first and second slots 302, 306 or may include the first and third slots 302, 310.

The illustrated slots 302, 306, 310 help propel food product through the conduit 294 over a longer distance. For example, while the single slot construction discussed above is operable to lift food product between about 11" and 18", or higher, above the fluid level in the tank 44, two or more slots may be employed to lift the food product even higher above the fluid level. Additional slots may be formed in a conduit, as necessary, to lift food product to a desired height above the fluid level.

Referring to FIGS. 6A-6B, the convex guide member 206 is an arcuate conduit portion positioned adjacent to and in communication with the outlet portion 218 of the conduit 194. The convex guide member 206 receives food product and fluid from the conduit 194 and redirects the food product and the fluid downwardly toward the dewatering member 210. The illustrated convex guide member 206 is configured such that the conduit 194, the convex guide member 206, and the dewatering member 210 form a generally inverted V-shape, as shown in FIG. 6A.

As shown in FIG. 6A, the dewatering member 210 is coupled to and in communication with the convex guide member 206. The illustrated dewatering member 210 separates the food product from the fluid and directs the food product out of the blancher 20 and onto a discharge transfer mechanism 36 (FIGS. 1 and 2A) at the outlet end 40 of the tank 44. In the illustrated construction, the dewatering member 210 includes (see FIG. 6A) a screen 282. The screen 282 is inclined to define a ramp for food product to tumble (e.g., slide and/or roll) downwardly along. For example, the illustrated screen 282 is inclined to define a surface substantially parallel to the direction of flow of the food product exiting the convex guide member 206, reducing turbulence and disruption of the flow from the convex guide member 206 to the dewatering member 210.

The screen 282 also defines openings for the fluid to fall through under the influence of gravity into the dewatering zone 54 (see FIGS. 1 and 2A). The openings are smaller than the food product so that, as fluid falls through the screen 282, the food product is retained on the screen 282 and continues toward the discharge transfer mechanism 36. In some constructions, a portion of the conduit 194 and/or the convex guide member 206 may also be a screen to facilitate dewatering the food product.

In operation, referring to FIGS. 1 and 2A, uncooked food product is inserted into the blancher 20 through the inlet end 32 of the tank 44. The auger 88 is rotated to move the uncooked food product through the hot heat transfer medium in the screen 24 in the blanching zone 52. As the food product moves through the heat transfer medium, the food product becomes cooked. The food product travels through the blanching zone 52 until reaching the approximately the outlet end wall 124 of the screen 24. The vacuum force generated by the fluid discharge 198 and the pump 202 of the transfer mechanism 190 pulls the cooked food product from the screen 24, through the opening 136 in the screen sidewall 128 and into the conduit 194 of the transfer mechanism 190.

Referring to FIGS. 6A-6B, once the food product is pulled into the conduit 194, the pressurized fluid exiting the slot 258 lifts and pushes the food product against the force of gravity to move the food product toward the convex guide member 206. The food product and the fluid flow through the convex guide member 206 and onto the dewatering member 210. At this time, the food product tumbles down the dewatering member 210 and is discharged from the blancher 20 via the discharge transfer mechanism 36 (see FIGS. 1 and 2A). The discharge transfer mechanism 36 then directs the food product to a packaging system or another food processing system. The separated fluid falls through the screen 282 of the dewatering member 210 and into the dewatering zone 54. The separated fluid returns to the blanching zone 52 to be used to help cook more food product in the blanching zone 52.

Figure 8B:
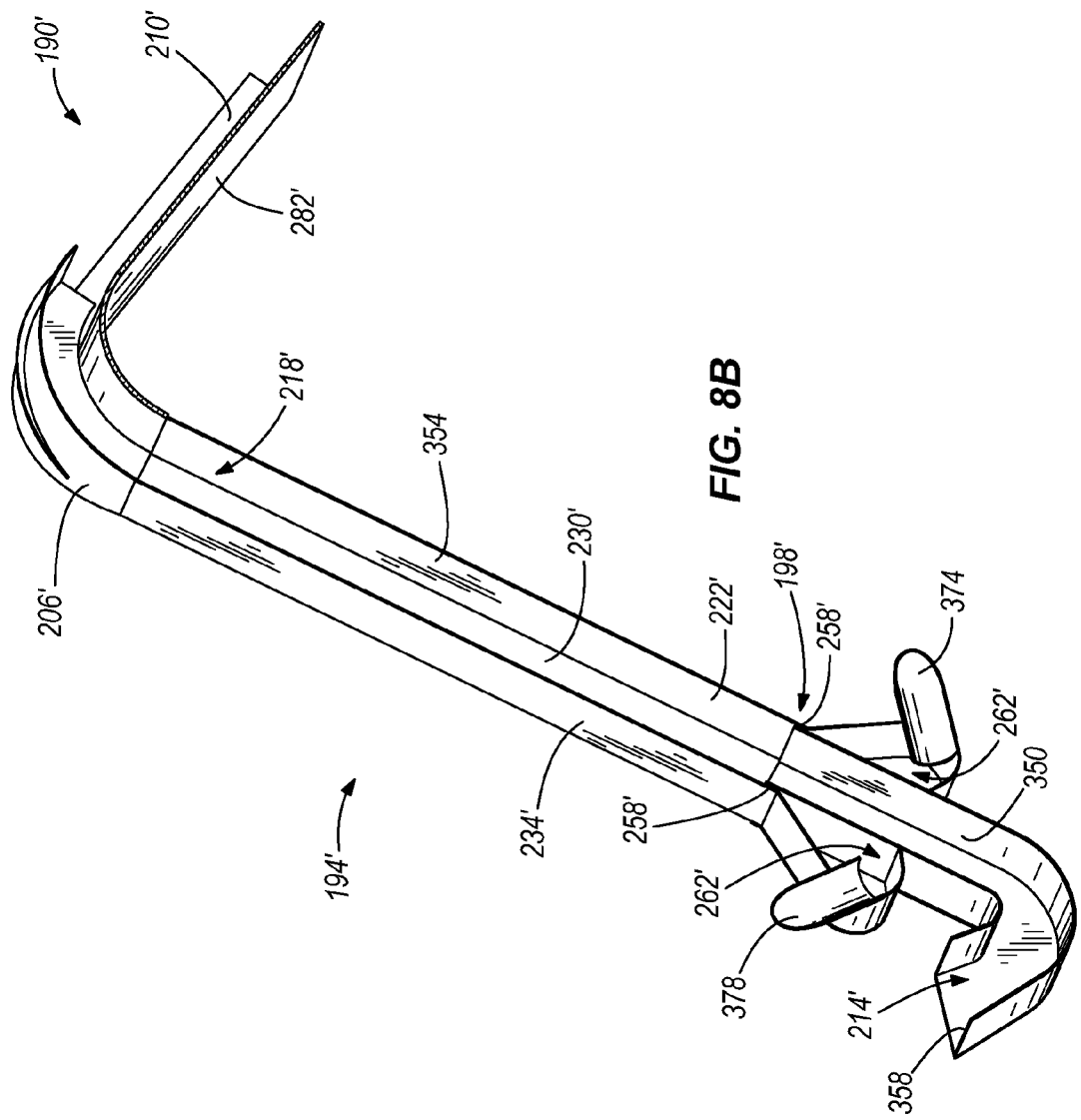
Figure 8C:
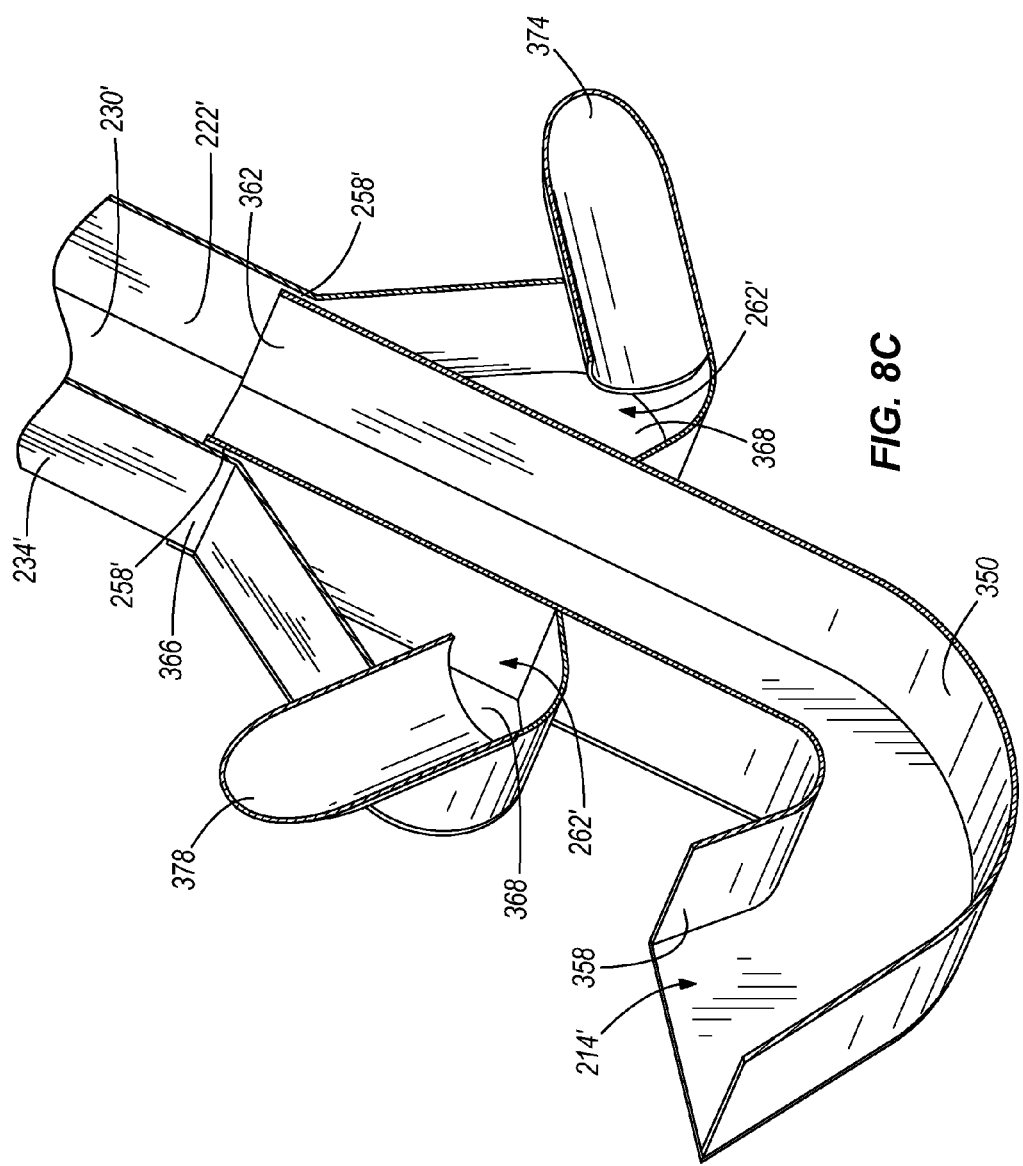

FIGS. 8A-8C illustrate yet another alternative construction of a transfer mechanism 190'. The illustrated transfer mechanism 190' is similar to the transfer mechanisms 190, 290 discussed above with respect to FIGS. 6A-6B and 7. Common elements have the same reference numbers "'". Reference is made to the description of the transfer mechanisms 190, 290 above for details of the structures and operation, as well as alternatives to the structures and operation, of the transfer mechanism 190' not specifically discussed herein.

In the illustrated construction, the transfer mechanism 190' generally includes a dual opposing slot discharge arrangement. The illustrated transfer mechanism 190' includes a conduit 194', a fluid discharge 198' (shown in FIGS. 8B-8C), a pressurized fluid source (not shown but similar to the pressurized fluid source 202 shown FIG. 6B), a convex guide member 206', and a dewatering member 210'.

Similar to the conduits 194, 294 of the transfer mechanisms 190, 290 discussed above, the illustrated conduit 194' has a generally rectangular cross-section. In the illustrated construction, the width of the conduit 194' is substantially constant from an inlet portion 214' of the conduit 194' to an outlet portion 218'. The conduit 194' includes a lower wall 222', side walls 226', 230' and an upper wall 234'. The conduit 194' defines a central axis 254' extending from the inlet portion 214' to the outlet portion 218'. The axis 254' and the conduit 190' may be in, offset from and substantially parallel to, or oblique to the central longitudinal plane extending through the tank 44.

In the illustrated construction, the conduit 194' includes an inlet conduit section 350 providing the inlet portion 214' and a main conduit section 354 connected to the inlet conduit section 350 and providing the outlet portion 218'. As shown in FIGS. 8B-8C, a first end 358 of the inlet conduit section 350 is in communication with (see FIGS. 1 and 2A) the screen 24 through the opening 136 in the screen sidewall 128 and below the fluid level in the blanching zone 52. A second end 362 (see FIGS. 9B-9C) of the inlet conduit section 350 fits within or is inserted into a first end 366 of the main conduit section 354. As discussed below in more detail, the inlet conduit section 350 and the main conduit portion 354 cooperate to define the fluid discharge 198'. In the illustrated construction, the inlet conduit section 350 is generally V-shaped, and the main conduit section 354 is generally inclined toward the outlet portion 218'.

In the illustrated construction, the fluid discharge 198' includes a pair of opposing slots 258' positioned proximate the inlet portion 214' of the conduit 194'. The illustrated slots 258' are vertically spaced apart, generally on the top and bottom of the conduit 194' (proximate the lower wall 222' and the upper wall 234'). In other constructions (not shown), in addition to or instead of the top and bottom slots 258', laterally spaced apart slots may be provided on the opposite sides of the conduit 194' (proximate each side wall 226', 230'). Each slot 258' is defined between an outer surface of the second end 362 of the inlet conduit section 350 and an inner surface of a first end 366 of the main conduit section 354.

Similar to the slot 258 discussed above, each slot 258' helps focus, and thereby pressurize, fluid from the fluid source, ensuring the fluid has sufficient flow strength to push food product upwardly through the conduit 194' to the outlet portion 218'. The slots 258' provide a continuous discharge of fluid along the entire width of and at the top and bottom of the conduit 194'. In the illustrated embodiment, each slot 258' has a height of approximately 1/8" to help focus and pressurize the fluid. In other constructions, the height of each slot 258' may be relatively larger or smaller (e.g., from about 3/16" to about 1/16") to allow more or less fluid to simultaneously flow out of the slot 258'. In still other constructions, the size of the slot 258' may be even larger or smaller depending upon the desired capacity of the transfer mechanism 190'.

Each slot 258' is formed between the outer surface of the inlet conduit section 350 and the adjacent inner surface of the main conduit section 354. A portion of the associated wall (e.g., the lower wall 222' and the upper wall 234') of the main conduit section 354 may be bent to form, in cooperation with the outer surface of the inlet conduit section 350 and with side walls 368, a generally teardrop-shaped chamber or opening 262'.

An outlet pipe 270' of the pressurized fluid source (e.g., a pump (not shown)) is in fluid communication with each opening 262'. The outlet pipe 270' includes a main pipe 370 which branches off into a pipe section 374, 378 connected to each opening 262'. In the illustrated construction, the pipe sections 374, 378 extend through the associated wall 222', 234' of the conduit 194' and into the associated opening 262'. The outlet pipe 270' directs fluid from the pump, through the main pipe 370 and through the pipe sections 374, 378, into each opening 262', and out of each slot 258'. In other constructions (not shown), a separate pipe may be in fluid communication between the pump and each opening 262'.

Similar to the transfer mechanism 190 discussed above, the fluid discharge 198' and the pump generate a vacuum force at the inlet portion 214' of the conduit 194'. The vacuum force helps draw food product from the screen 24, through the opening 136 in the screen sidewall 128 and into the inlet portion 214' such that the pressurized fluid exiting the slots 258' can move the food product toward the outlet portion 218'.

In the illustrated construction, the dual opposing slot arrangement of the transfer mechanism 190' effectively doubles the width of the plenum when compared to the transfer mechanism 190. To maintain the same flow rate, the width of the conduit 194' is reduced relative to the width of the conduit 194 (e.g., by about one half), and the depth is increased (e.g., approximately doubled). The dual opposing slot arrangement mirrors the fluid flow effect with each slot 254' (e.g., at the top and bottom of the conduit 194') which may keep food product toward the middle of the conduit 194' (away from the wall associated with each slot 258'). This arrangement also may allow a larger opening for the inlet portion 214' to accommodate larger-sized food products (e.g., larger than about 1" in diameter).

In the transfer mechanism 190', the slots 258' may be positioned relatively farther away from the inlet portion 214' (when compared to the transfer mechanism 190) to allow the food product to accelerate before the transition to full flow rate near the slots 258' so that this transition is not as abrupt. The added distance (approximately 15") generally enables the food product to accelerate before hitting the high velocity transition at the location of the slot 258'.

With the slotted arrangement, the velocity of the fluid ejected from each slot 258' is greater generally toward the center of the slot 258' (between the inner surface of a first end 366 of the main conduit section 354 and the outer surface of the second end 362 of the inlet conduit section 350) and decreases toward the middle of the conduit 194' (and toward the associated wall (e.g., wall 222' or 234')). The food product tends to stay toward the middle of the conduit 194' in an area of lower flow rate fluid. This may contribute to the slotted arrangement being gentler on food products.

The main conduit section 354 is connected to the convex guide member 206' and to the dewatering member 210'. In the illustrated construction, the dewatering member 210' may have generally the same size and shape as the dewatering member 210 in the transfer mechanism 190. However, because the conduit 194' has a relatively narrower width and increased depth compared to the conduit 194, the convex guide member 206' generally flares to the width of and tapers to the depth of the dewatering member 210'.

Figure 9A:
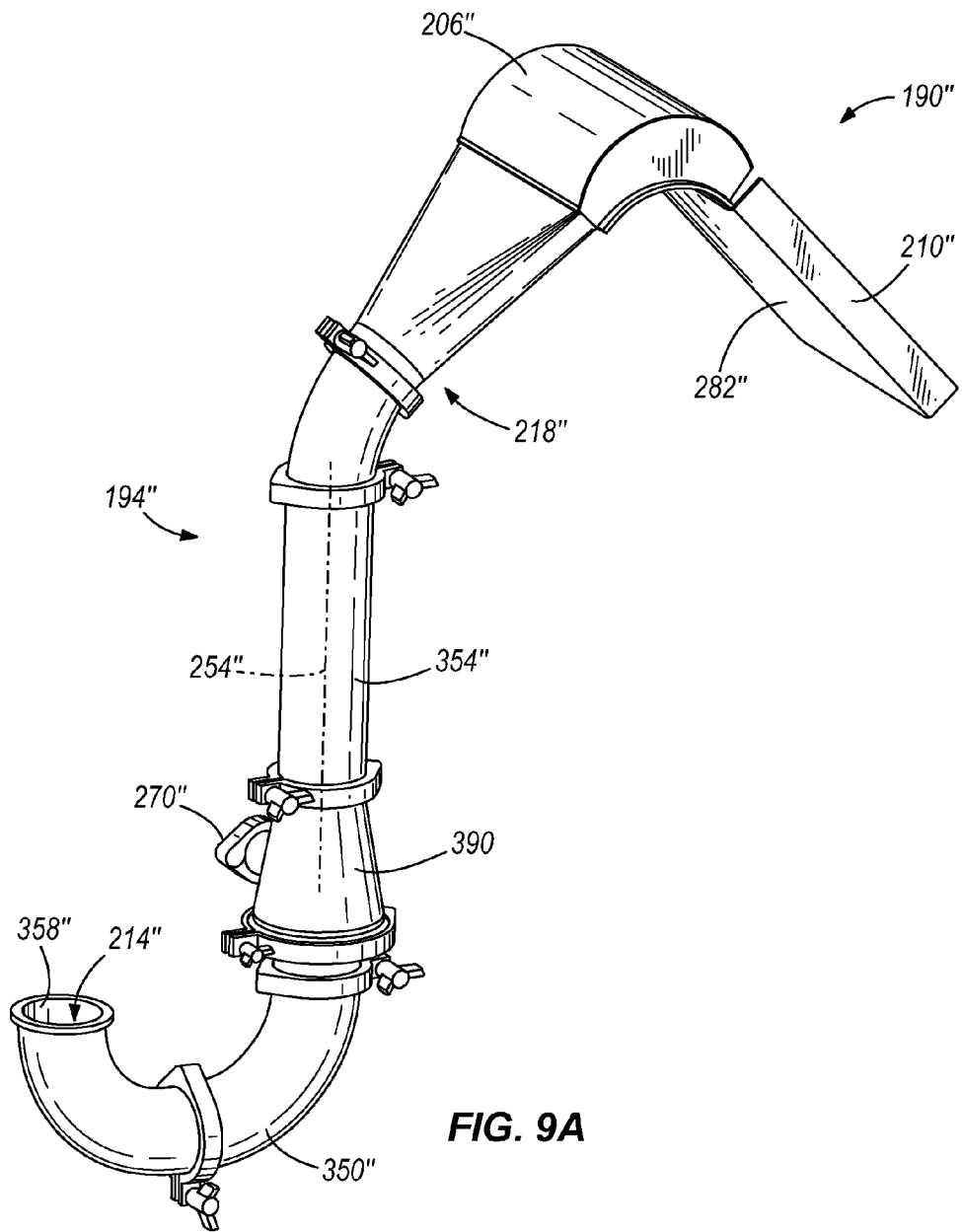
FIGS. 9A-9C are perspective views of another transfer mechanism for use with the blancher shown in FIG. 1.
Figure 9B:
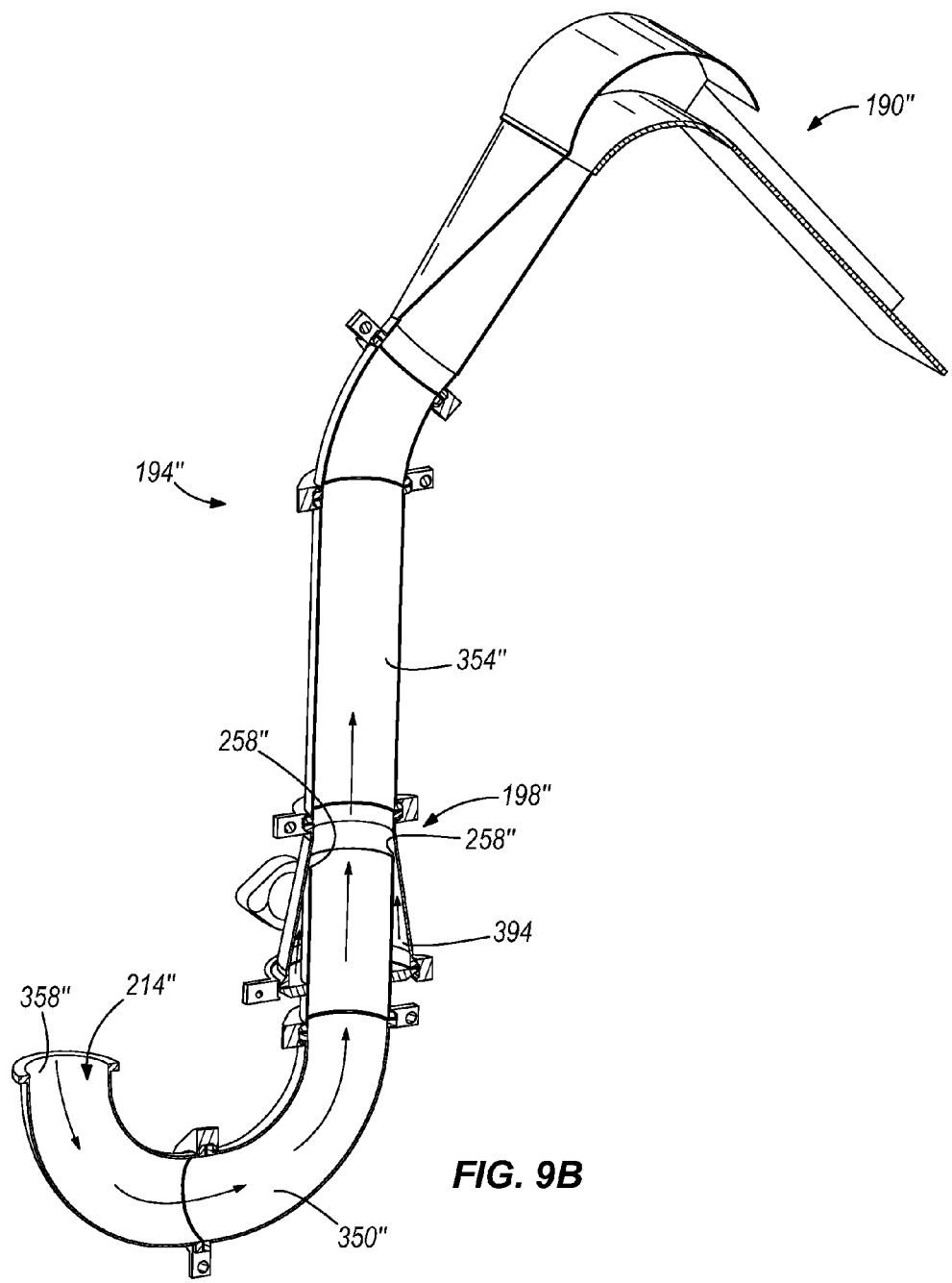
Figure 9C:
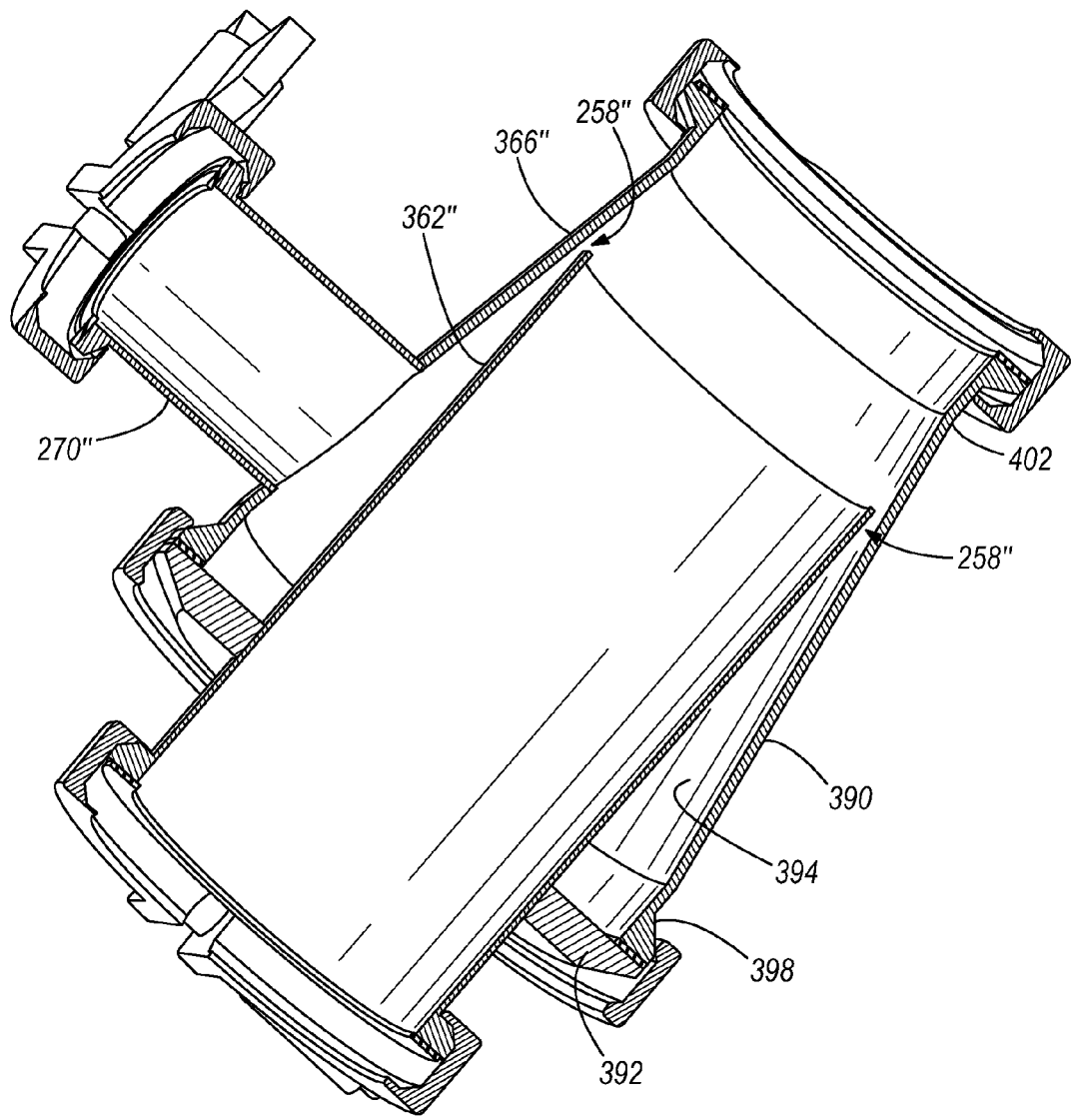

FIGS. 9A-9C illustrate another alternative construction of a transfer mechanism 190". The illustrated transfer mechanism 190" is similar to the transfer mechanisms 190, 290, 190' discussed above with respect to FIGS. 6A-6B, 7 and 8A-8C. Common elements have the same reference numbers "'"'". Reference is made to the description of the transfer mechanisms 190, 290, 190' above for details of the structures and operation, as well as alternatives to the structures and operation, of the transfer mechanism 190" not specifically discussed herein.

In the illustrated construction, the transfer mechanism 190" includes a generally round conduit 194" with an annular discharge arrangement. The illustrated transfer mechanism 190" includes a conduit 194", a fluid discharge 198" (shown in FIGS. 9B-9C), a pressurized fluid source (not shown but similar to the pressurized fluid source 202 shown FIG. 6B), a convex guide member 206", and a dewatering member 210".

As mentioned above, the illustrated conduit 194" has a generally round cross-section. In the illustrated construction, the diameter of the conduit 194" is substantially constant from an inlet portion 214" of the conduit 194" to an outlet portion 218". The conduit 194" defines a central axis 254" extending from the inlet portion 214" to the outlet portion 218". The axis 254", and thereby the conduit 194", may be in, offset from and substantially parallel to or oblique to the central longitudinal plane extending through the tank 44 of the blancher 20.

In the illustrated construction, the conduit 194" includes an inlet conduit section 350" providing the inlet portion 214" and a main conduit section 354" connected to the inlet conduit section 350" and providing the outlet portion 218". As shown in FIGS. 9B-9C, a first end 358" of the inlet conduit section 350" is in communication with (see FIGS. 1 and 2A) the screen 24 through the opening 136 in the screen sidewall 128 and below the fluid level in the blanching zone 52. A second end 362" (see FIGS. 9B-9C) of the inlet conduit section 350" fits within or is inserted into a first end 366" of the main conduit section 354". As discussed below in more detail, the inlet conduit section 350" and the main conduit portion 354" cooperate to define the fluid discharge 198". In the illustrated construction, the inlet conduit section 350" is generally U-shaped, and the main conduit section 354" includes a substantially vertical portion.

In the illustrated construction, the fluid discharge 198" includes an annular slot 258" positioned proximate the inlet portion 214" of the conduit 194". The illustrated slot 258" extends substantially about the perimeter of the second end 362" of inlet conduit section 350". The slot 258" is defined between an outer surface of the second end 362" of the inlet conduit section 350" and an inner surface of a first end 366" of the main conduit section 354". In other constructions (not shown), the fluid discharge 198" may include one or more slots which extend only about a portion of the circumference.

Similar to the slot 258, 258', discussed above, the slot 258" helps focus, and thereby pressurize, fluid from the fluid source, ensuring the fluid has sufficient flow strength to push food product upwardly through the conduit 194" to the outlet portion 218". The slot 258" provides a continuous discharge of fluid about the circumference of interior of the conduit 194". In the illustrated embodiment, the slot 258" has a height of approximately ⅛" to help focus and pressurize the fluid. In other constructions, the height of the slot 258" may be relatively larger or smaller (e.g., from about 3/16" to about 1/16") to allow more or less fluid to simultaneously flow out of the slot 258". In still other constructions, the size of the slot 258" may be even larger or smaller depending upon the desired capacity of the transfer mechanism 190".

As mentioned above, the slot 258" is formed between the outer surface of the inlet conduit section 350" and the adjacent inner surface of the main conduit section 354". The main conduit section 354" includes a conical portion 390 surrounding a portion of the outer surface of the inlet conduit section 350" upstream of the slot 258" to form, with an end plate 392, a chamber 394 surrounding the portion of the inlet conduit section 350". An outlet pipe 270" of the pressurized fluid source (e.g., a pump (not shown)) is in fluid communication with the chamber 394. The outlet pipe 270" directs fluid from the pump, into the chamber 394 and out of the slot 258".

The conical portion 390 has a first diameter section 398 with a diameter larger than the outer diameter of the inlet conduit section 350" and tapers to a second diameter section 402 having a diameter about equal to the inner diameter of the inlet conduit section 350". The inlet conduit section 350" is inserted to position between the first diameter section 398 and the second diameter section 402 to define the slot 258" with the desired height. With this arrangement, the conduit 194" generally has the same interior diameter throughout the inlet conduit section 350 and the main conduit section 354".

Similar to the transfer mechanisms 190, 290, 190' discussed above, the fluid discharge 198" and the pump generate a vacuum force at the inlet portion 214" of the conduit 194". The vacuum force helps draw food product from the screen 24, through the opening 136 in the screen sidewall 128 and into the inlet portion 214" such that the pressurized fluid exiting the slot 258" can move the food product toward the outlet portion 218".

The annular slot arrangement provides the fluid flow effect around the circumference of the interior of the conduit 194" which tends to keep food product toward the middle of the conduit 194" (and away from the wall of the conduit 194"). This arrangement also may allow a larger opening for the inlet portion 214" to accommodate larger-sized food products (e.g., larger than about 1" in diameter).

In the transfer mechanism 190", the slot 258" may be positioned relatively farther away from the inlet portion 214" (when compared to the transfer mechanisms 190, 190') to allow the food product to accelerate before the transition to full flow rate near the slot 258" so that this transition is not as abrupt. The added distance (approximately 25") generally enables the food product to accelerate before hitting the high velocity transition at the location of the slot 258".

Also, with the annular slot arrangement, the velocity of the fluid ejected from the slot 258" is greater generally toward the center of the slot 258" (between the inner surface of a first end 366" of the main conduit section 354" and the outer surface of the second end 362" of the inlet conduit section 350") and decreases toward the middle of the conduit 194" (and toward the wall of the conduit 194"). The food product tends to stay toward the middle of the conduit 194" in an area of lower flow rate fluid. Again, this may contribute to the slot arrangement being gentler on food products.

The round shape of the conduit 194" may provide increased flexibility with respect to, for example, sanitation, orientation, etc. As mentioned above, the round shape of the conduit 194" provides a flow effect that is annular about the circumference of the interior of the conduit 194". The round conduit 194" may be gentler on food products but also may be more efficient, have greater capacity, provide higher lift, provide easier piping opportunities, etc.

With the round conduit 194", the transfer mechanism 190" may enable the food product to be lifted vertically through a significant portion of the conduit 194". The vertical portion of the conduit 194" generally decreases the overall length of the transfer mechanism 190" and the space requirement in the blancher 20.

The round main conduit section 354" is connected to the convex guide member 206" and to the generally rectangular dewatering member 210". In the illustrated construction, the dewatering member 210" may have generally the same size and shape as the dewatering member 210, 210' in the transfer mechanisms 190, 190'. However, because the conduit 194" has a round cross-section with a diameter that is smaller than the width and greater than the depth of the generally rectangular conduit 194, the convex guide member 206" (and/or the downstream end of the main conduit section 354") transitions from the round cross-section of the conduit 194" to the rectangular cross-section of the dewatering member 210". The convex guide member 206" also generally flares to the width of and tapers to the depth of the dewatering member 210".

Figure 10A:
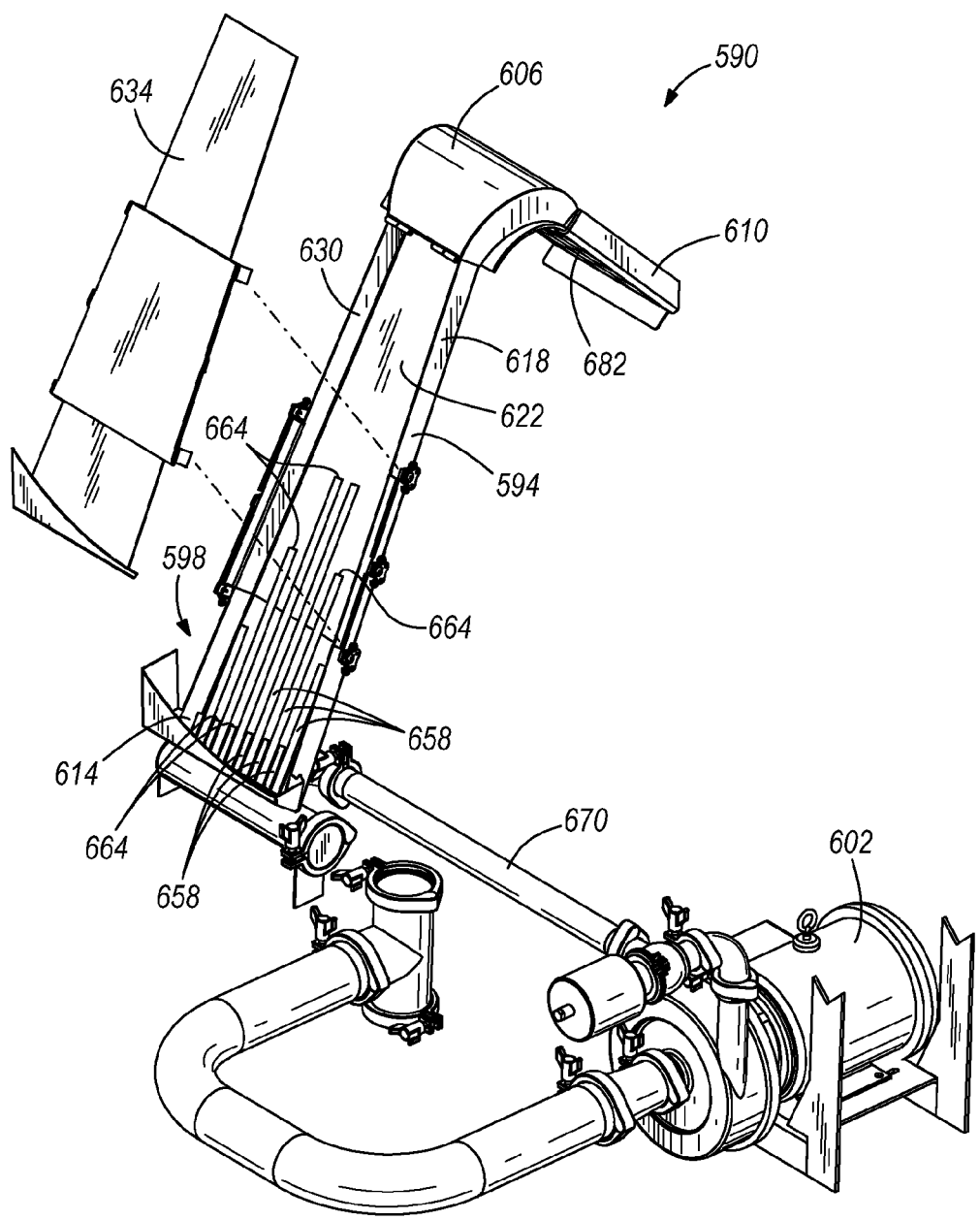
FIGS. 10A-10B are views of yet another transfer mechanism for use with the blancher shown in FIG. 1.
Figure 10B:
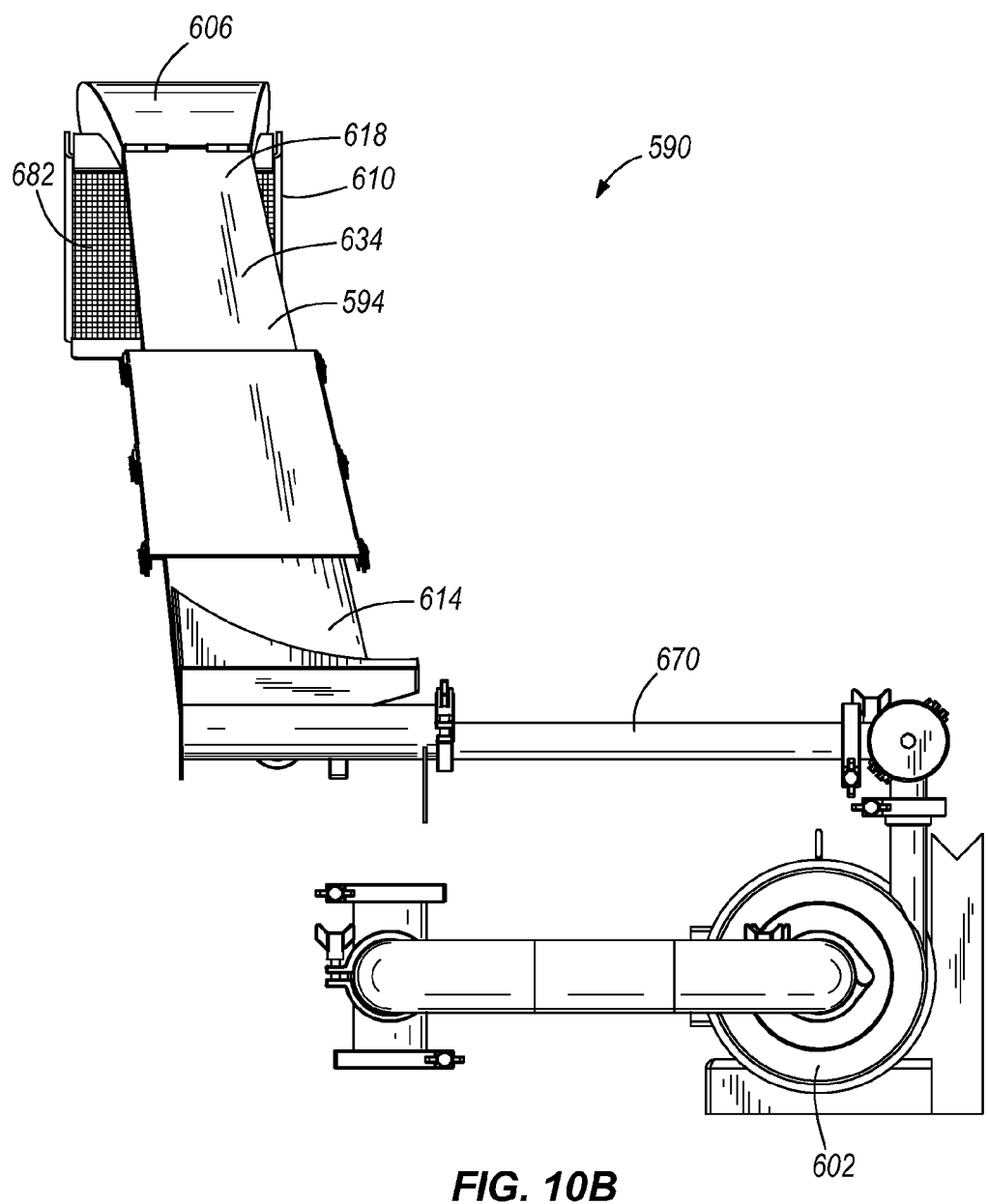

FIGS. 10A-10B illustrate a further alternative construction of a transfer mechanism 590. The illustrated transfer mechanism 590 is similar to the transfer mechanisms 190, 290, 190', 190" discussed above with respect to FIGS. 6A-6B, 7, 8A-8C and 9A-9C. Common elements have the same reference numbers increased by 400. Reference is made to the description of the transfer mechanisms 190, 290, 190', 190" above for details of the structures and operation, as well as alternatives to the structures and operation, of the transfer mechanism 590 not specifically discussed herein.

Generally, rather than the slot(s) 258, 258', 258", the fluid discharge 598 of the transfer mechanism 590 includes one or more nozzles 658, each having an outlet 664. The nozzle(s) 658 and the pump 602 generate a vacuum force at the inlet portion 614 of the conduit 94. The vacuum force helps draw food product from the screen 24, through the opening 136 in the screen sidewall 128 and into the inlet portion 614 such that the pressurized fluid exiting the nozzle(s) 658 can move the food product toward the outlet portion 618.

In some constructions, the blancher 20 may have zones with different temperatures. For example, cooking may be provided in the blanching zone 52, and lower temperature fluid may be introduced in the transfer mechanism 190 to begin to cool the food product moving through the transfer mechanism 190. In such a construction, the fluid from the dewatering zone 54 (having a lower temperature than the medium in the blanching zone 52) would not be immediately returned to the blanching zone 52. A dividing wall may be provided to divide the blanching zone 52 and the dewatering zone 54.

In some constructions, the blancher 20 could be used in a cooker-cooler arrangement. In such a construction, the blancher 20 can provide the cooker portion, and the transfer mechanism 190 can transfer the food product from the cooker portion to a separate cooler portion. Another transfer mechanism, which may be similar to the transfer mechanism 190, may be provided to transfer food product from the cooler portion.

In some constructions, the cooler portion can have a construction which is substantially similar to the structure of the blancher 20, though operated with a cool heat transfer medium. In other constructions, the cooler portion may be similar to the cooler shown in U.S. patent application Ser. No. 12/501,758, filed Jul. 13, 2009, the entire contents of which are hereby incorporated by reference.

The blancher 20 may improve the efficiency of food processing within a facility. In some constructions, the tank 44, as a pressure vessel, and the pressure limiting transfer mechanisms 28 and 36 enable the blancher 20 to be operated at a higher pressure and/or temperature than other types of blanchers. For example, the blancher 20 may be operated with steam at about 250° F. compared to other types of blanchers which operate with water at about 208° F. to 212° F., depending on the elevation at which the blancher is operated. The pressure vessel tank 44 is better suited to the higher operating parameters than an open-top tank, and the transfer mechanisms 28 and 36 maintain or help to maintain a sufficient seal such that the blancher 20 can be positively pressurized.

The blancher 20 may have improved overall cleanability and user-friendliness. Due to the ease of accessing, moving and cleaning the screen 24, 24A and due to the transfer mechanism 190, machine down time between product runs and the amount of labor required to facilitate cleaning is reduced. Further, the open-top screen design and rotation of the screen 24, 24A for cleaning allows greater access to the screen 24, 24A and the bottom of tank 44 for cleaning contaminant accumulation, and facilitates use of an automated cleaning system. As a result, more batches of food product may be processed during a single day or shift.

Further, the blancher 20 may have an increased capacity for processing foods but may also gently handle the food product advanced through the tank. Directed flow of water through the screen 24, 24A may reduce temperature variation in the food product, help fluidize food product within the screen 24, 24A, allow additional food product to be deposited in the screen 24, 24A because the food product does not rest on the side wall 128, 128A of the screen 24, 24A, etc. Thus, the food processing apparatus described above process a volume of food product typically processed in a larger machine, while occupying less floor space.

In the constructions in which the screen 24, 24A is supported on the support shaft 92 of the auger 88, such a configuration allows for very tight tolerances between the screen 24, 24A and the auger flights 104, which may prevent damage to food product because there is not sufficient room for food product to become stuck between the screen 24, 24A and the auger flights 104. Further, the tight tolerance will not decrease a clearance between the two as the screen bearings 144, 144A wear and may prevent metal-to-metal contact between the screen 24, 24A and the auger 88.

One or more independent features and independent advantages of the invention may be set forth in the following claims.

What is claimed is:

1. A food processing apparatus comprising:
   a pressure vessel defining a compartment having an inlet end for receiving food product and an outlet end for discharging food product;
   an open-top screen mounted within the compartment, the screen being movable relative to the compartment between a first position, for food processing, and a second position, to facilitate cleaning;
   a mechanism interconnected with the screen operable to hold the screen in the first position and further operable to release the screen; and
   a rotatable auger mounted such that at least a portion of the auger is within the screen, the auger being operable to advance food product within the compartment from the inlet end toward the outlet end.

2. The food processing apparatus of claim 1, wherein the mechanism is a screen drive interconnected with the screen, the screen drive including a brake motor operable to hold the screen in the first position, wherein, when the brake motor is released, the screen drive moves the screen to the second position.

3. The food processing apparatus of claim 1, and further comprising a support shaft rotatably supporting the auger, wherein the screen is mounted on and rotates about the support shaft to move from the first position toward the second position.

4. The food processing apparatus of claim 1, and further comprising a plurality of injectors disposed in the compartment between a compartment wall and the screen when the screen is in the first position, the injectors discharging a fluid under pressure toward the screen.

5. The food processing apparatus of claim 4, wherein, with the screen in the first position, the injectors are operable to discharge fluid through the screen to displace food product in the screen, and wherein, with the screen in the second position, the injectors are operable to discharge fluid against an inner surface of the screen to facilitate cleaning of the screen.

6. The food processing apparatus of claim 1, and further comprising a pressure-limiting transfer mechanism for transferring food product relative to the pressure vessel and limiting pressure discharge from the pressure vessel during transfer of food product.

7. The food processing apparatus of claim 6, wherein the pressure-limiting transfer mechanism includes
a housing, and
a rotor supported by the housing, the housing and the rotor cooperating to define a first chamber and a second chamber,
wherein the rotor is movable relative to the housing to selectively position the first chamber and the second chamber in a first position, in which food product is transferred between an exterior of the food processing apparatus and a one of the first chamber and the second chamber in the first position, and a second position, in which food product is transferred between the compartment and a one of the first chamber and the second chamber in the second position.

8. The food processing apparatus of claim 6, wherein the pressure-limiting transfer mechanism is an inlet transfer mechanism and is operable to transfer food product from the exterior of the food processing apparatus and into the compartment, and wherein the food processing apparatus further comprises a discharge pressure-limiting transfer mechanism for transferring food product from the compartment to the exterior of the food processing apparatus and limiting pressure discharge from the pressure vessel during transfer of food product.

9. The food processing apparatus of claim 1, and further comprising a second transfer mechanism including
a conduit positioned in the pressure vessel and including a first end portion configured to be in communication with the compartment and a second end portion,
a fluid discharge positioned substantially within the conduit between the first end portion and the second end portion, and
a pressurized fluid source in communication with the fluid discharge, the pressurized fluid source being operable to propel a fluid through the fluid discharge to move food product from the first end portion of the conduit toward the second end portion of the conduit.

10. The food processing apparatus of claim 9, wherein the screen has a circumferentially-extending screen surface, the screen surface defining a screen opening proximate an outlet end of the screen, and wherein, with the screen in the first position, the first end portion of the conduit is in communication with the screen opening such that the second transfer mechanism is operable to move food product from the screen, through the screen opening and toward the second end portion of the conduit.

11. A food processing apparatus comprising:
a pressure vessel defining at least one compartment having an inlet end for receiving food product and an outlet end for discharging food product;
a conveyor mechanism mounted in the compartment and operable to move food product from the inlet end and toward the outlet end;
a transfer mechanism including
a conduit positioned in the pressure vessel and including a first end portion configured to be in communication with the compartment and a second end portion,
a fluid discharge positioned substantially within the conduit between the first end portion and the second end portion, and
a pressurized fluid source in communication with the fluid discharge, the pressurized fluid source being operable to propel a fluid through the fluid discharge to move food product from the first end portion of the conduit toward the second end portion of the conduit; and
a pressure-limiting transfer mechanism for transferring food product relative to the pressure vessel and limiting pressure discharge from the pressure vessel during transfer of food product.

12. The food processing apparatus of claim 11, wherein the transfer mechanism further includes
a dewatering member in communication with the second end portion of the conduit, the dewatering member including a screen, the dewatering member receiving food product and fluid from the conduit and facilitating separation of the food product from the fluid, and
a convex guide member positioned between the second end portion of the conduit and the dewatering member, the convex guide member directing food product and fluid from the conduit into the dewatering member.

13. The food processing apparatus of claim 11, wherein the fluid discharge includes one of a slot positioned between the first end portion of the conduit and the second end portion of the conduit and a plurality of nozzles having outlets positioned between the first end portion of the conduit and the second end portion of the conduit.

14. The food processing apparatus of claim 13, wherein the conduit includes
an inlet conduit section providing the first end portion, the inlet conduit section having an inlet end in fluid communication with the compartment and an opposite end with an outer surface, and
a main conduit section having a first end with an inner surface, the opposite end of the inlet conduit section being inserted in the first end of the main conduit section, and
wherein the fluid discharge includes a slot at least partially defined between the outer surface of the opposite end of the inlet conduit section and the inner surface of the first end of the main conduit section.

15. The food processing apparatus of claim 14, wherein the inlet conduit section has a round cross-section and a circumference, wherein the main conduit section has a round cross-section, wherein the fluid discharge includes a slot at least partially defined between the outer surface of the opposite end of the inlet conduit section and the inner surface of the first end of the main conduit section, the slot extending about the circumference of the opposite end of the inlet conduit section, and wherein the pressurized fluid source is operable to propel a fluid through the slot to move food product from the first end portion of the conduit toward the second end portion.

16. The food processing apparatus of claim 14, wherein the inlet conduit section includes two pairs of opposing walls forming a generally rectangular cross-section, wherein the main conduit section includes two pairs of opposing walls forming a generally rectangular cross-section, wherein the fluid discharge includes
 a first slot defined between the outer surface of one wall of one pair of opposing walls of the inlet conduit section and the inner surface of one wall of an associated pair of opposing walls of the main conduit section, and
 an opposing second slot defined between the outer surface of the other wall of the one pair of opposing walls of the inlet conduit section and the inner surface of the other wall of the associate pair of opposing walls of the main conduit section, and
 wherein the pressurized fluid source is operable to propel a fluid through the first slot and through the second slot to move food product from the first end portion of the conduit toward the second end portion.

17. The food processing apparatus of claim 11, wherein the pressure-limiting transfer mechanism includes
 a housing, and
 a rotor supported by the housing, the housing and the rotor cooperating to define a first chamber and a second chamber,
 wherein the rotor is movable relative to the housing to selectively position the first chamber and the second chamber in a first position, in which food product is transferred between an exterior of the food processing apparatus and a one of the first chamber and the second chamber in the first position, and a second position, in which food product is transferred between the compartment and a one of the first chamber and the second chamber in the second position.

18. The food processing apparatus of claim 11, wherein the pressure-limiting transfer mechanism is an inlet transfer mechanism and is operable to transfer food product from the exterior of the food processing apparatus and into the compartment, and wherein the food processing apparatus further comprises a discharge pressure-limiting transfer mechanism for transferring food product from the compartment to the exterior of the food processing apparatus and limiting pressure discharge from the pressure vessel during transfer of food product.

* * * * *